(12) United States Patent
Pollutro et al.

(10) Patent No.: US 8,910,241 B2
(45) Date of Patent: Dec. 9, 2014

(54) COMPUTER SECURITY SYSTEM

(75) Inventors: Dennis Vance Pollutro, Clymer, NY (US); Kiet Tuan Tran, Saratoga, CA (US); Srinivas Kumar, Cupertino, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1535 days.

(21) Appl. No.: 12/163,292

(22) Filed: Jun. 27, 2008

(65) Prior Publication Data

US 2009/0328186 A1 Dec. 31, 2009

Related U.S. Application Data

(63) Continuation-in-part of application No. 10/423,444, filed on Apr. 25, 2003, now Pat. No. 7,644,434, and a continuation-in-part of application No. 10/583,578, filed as application No. PCT/US2004/043405 on Dec. 22, 2004.

(60) Provisional application No. 60/533,769, filed on Dec. 31, 2003, provisional application No. 60/937,470, filed on Jun. 28, 2007, provisional application No. 60/375,326, filed on Apr. 25, 2002, provisional application No. 60/375,362, filed on Apr. 25, 2002.

(51) Int. Cl.
| | |
|---|---|
| *G06F 7/04* | (2006.01) |
| *G06F 12/14* | (2006.01) |
| *H04L 29/06* | (2006.01) |
| *G06F 21/62* | (2013.01) |
| *G06F 21/31* | (2013.01) |
| *G06F 21/33* | (2013.01) |

(52) U.S. Cl.
CPC ........ *G06F 21/6218* (2013.01); *H04L 63/0838* (2013.01); *G06F 2221/2101* (2013.01); *H04L 63/104* (2013.01); *H04L 63/067* (2013.01); *G06F 2221/2119* (2013.01); *G06F 21/31* (2013.01); *G06F 21/335* (2013.01); *H04L 63/164* (2013.01); *G06F 2221/2117* (2013.01)
USPC .......... 726/2; 726/1; 726/13; 726/29; 726/30; 713/176

(58) Field of Classification Search
None
See application file for complete search history.

(56) References Cited

U.S. PATENT DOCUMENTS

| | | |
|---|---|---|
| 5,218,637 A | 6/1993 | Angebaud et al. |
| 5,757,916 A | 5/1998 | MacDoran et al. |

(Continued)

FOREIGN PATENT DOCUMENTS

| | | |
|---|---|---|
| CA | 2 286 534 | 4/2001 |
| EP | 1 071 256 | 1/2001 |

(Continued)

OTHER PUBLICATIONS

Aleksander Svelokken, "Biometric Authentication and Identification Using Keystroke Dynamics With Alert Levels", Master Thesis (Retrieved from University of Oslo), May 23, 2007, pp. 1-124.

(Continued)

*Primary Examiner* — Kaveh Abrishamkar
(74) *Attorney, Agent, or Firm* — Foley & Lardner LLP; Christopher J. McKenna

(57) ABSTRACT

A method of packet management for restricting access to a resource of a computer system. The method includes identifying client parameters and network parameters, as a packet management information, used to determine access to the resource, negotiating a session key between client and server devices, generating a session ID based on at least the negotiated session key, inserting the packet management information and the session ID into each information packet sent from the client device to the server device, monitoring packet management information in each information packet from the client device, and filtering out respective information packets sent to the server device from the client device when the monitored packet management information indicates that access to the resource is restricted.

25 Claims, 22 Drawing Sheets

(56) References Cited

U.S. PATENT DOCUMENTS

| | | |
|---|---|---|
| 5,784,562 A | 7/1998 | Diener et al. |
| 5,867,494 A | 2/1999 | Krishnaswamy et al. |
| 5,887,065 A | 3/1999 | Audebert |
| 5,983,270 A | 11/1999 | Abraham et al. |
| 5,987,611 A | 11/1999 | Freund |
| 5,999,525 A | 12/1999 | Krishnaswamy et al. |
| 6,021,495 A | 2/2000 | Jain et al. |
| 6,070,245 A | 5/2000 | Murphy, Jr. et al. |
| 6,076,108 A | 6/2000 | Courts et al. |
| 6,105,136 A | 8/2000 | Cromer et al. |
| 6,141,758 A | 10/2000 | Benantar et al. |
| 6,145,083 A | 11/2000 | Shaffer et al. |
| 6,161,182 A | 12/2000 | Nadooshan |
| 6,170,019 B1 | 1/2001 | Dresel et al. |
| 6,199,113 B1 | 3/2001 | Alegre et al. |
| 6,219,669 B1 | 4/2001 | Haff et al. |
| 6,253,326 B1 | 6/2001 | Lincke et al. |
| 6,304,969 B1 | 10/2001 | Wasserman et al. |
| 6,335,927 B1 | 1/2002 | Elliott et al. |
| 6,345,291 B2 | 2/2002 | Murphy, Jr. et al. |
| 6,393,569 B1 | 5/2002 | Orenshteyn |
| 6,418,472 B1 | 7/2002 | Mi et al. |
| 6,442,571 B1 | 8/2002 | Haff et al. |
| 6,452,915 B1 | 9/2002 | Jorgensen |
| 6,470,453 B1 | 10/2002 | Vilhuber |
| 6,473,794 B1 | 10/2002 | Guheen et al. |
| 6,480,967 B1 | 11/2002 | Jensen et al. |
| 6,502,192 B1 | 12/2002 | Nguyen |
| 6,510,350 B1 | 1/2003 | Steen et al. |
| 6,519,571 B1 | 2/2003 | Guheen et al. |
| 6,523,027 B1 | 2/2003 | Underwood |
| 6,535,917 B1 | 3/2003 | Zamanzadeh et al. |
| 6,536,037 B1 | 3/2003 | Guheen et al. |
| 6,594,589 B1 | 7/2003 | Coss, Jr. et al. |
| 6,601,233 B1 | 7/2003 | Underwood |
| 6,609,128 B1 | 8/2003 | Underwood |
| 6,615,166 B1 | 9/2003 | Guheen et al. |
| 6,633,878 B1 | 10/2003 | Underwood |
| 6,640,248 B1 | 10/2003 | Jorgensen |
| 6,704,873 B1 | 3/2004 | Underwood |
| 6,718,535 B1 | 4/2004 | Underwood |
| 6,721,713 B1 | 4/2004 | Guheen et al. |
| 6,731,625 B1 | 5/2004 | Eastep et al. |
| 6,735,691 B1 | 5/2004 | Capps et al. |
| 6,748,287 B1 | 6/2004 | Hagen et al. |
| 6,754,181 B1 | 6/2004 | Elliott et al. |
| 6,766,314 B2 | 7/2004 | Burnett |
| 6,785,692 B2 | 8/2004 | Wolters et al. |
| 6,826,616 B2 | 11/2004 | Larson et al. |
| 6,839,759 B2 | 1/2005 | Larson et al. |
| 6,850,252 B1 | 2/2005 | Hoffberg |
| 6,856,330 B1 | 2/2005 | Chew et al. |
| 6,870,921 B1 | 3/2005 | Elsey et al. |
| 6,909,708 B1 | 6/2005 | Krishnaswamy et al. |
| 6,944,279 B2 | 9/2005 | Elsey et al. |
| 6,947,992 B1 | 9/2005 | Shachor |
| 6,954,736 B2 | 10/2005 | Menninger et al. |
| 6,957,186 B1 | 10/2005 | Guheen et al. |
| 6,985,922 B1 | 1/2006 | Bashen et al. |
| 7,013,290 B2 | 3/2006 | Ananian |
| 7,039,606 B2 | 5/2006 | Hoffman et al. |
| 7,054,837 B2 | 5/2006 | Hoffman et al. |
| 7,072,843 B2 | 7/2006 | Menninger et al. |
| 7,096,495 B1 | 8/2006 | Warrier et al. |
| 7,100,195 B1 | 8/2006 | Underwood |
| 7,107,285 B2 | 9/2006 | Von Kaenel et al. |
| 7,120,596 B2 | 10/2006 | Hoffman et al. |
| 7,145,898 B1 | 12/2006 | Elliott |
| 7,149,698 B2 | 12/2006 | Guheen et al. |
| 7,149,803 B2 * | 12/2006 | Douglis et al. ................ 709/228 |
| 7,160,599 B2 | 1/2007 | Hartman |
| 7,165,041 B1 | 1/2007 | Guheen et al. |
| 7,171,379 B2 | 1/2007 | Menninger et al. |
| 7,188,138 B1 | 3/2007 | Schneider |
| 7,188,180 B2 | 3/2007 | Larson et al. |
| 7,194,552 B1 | 3/2007 | Schneider |
| 7,331,061 B1 * | 2/2008 | Ramsey et al. ................ 726/23 |
| 7,334,125 B1 * | 2/2008 | Pellacuru ...................... 713/163 |
| 7,353,533 B2 | 4/2008 | Wright et al. |
| 7,363,347 B2 | 4/2008 | Thomas |
| 7,386,889 B2 * | 6/2008 | Shay ................................ 726/26 |
| 7,398,552 B2 | 7/2008 | Pardee et al. |
| 7,430,760 B2 | 9/2008 | Townsend et al. |
| 7,509,687 B2 | 3/2009 | Ofek et al. |
| 7,519,986 B2 | 4/2009 | Singhal |
| 7,567,510 B2 | 7/2009 | Gai et al. |
| 7,596,803 B1 | 9/2009 | Barto et al. |
| 7,637,147 B2 | 12/2009 | Lee et al. |
| 7,644,434 B2 | 1/2010 | Pollutro et al. |
| 7,660,902 B2 | 2/2010 | Graham et al. |
| 7,660,980 B2 | 2/2010 | Shay et al. |
| 7,770,223 B2 | 8/2010 | Shevenell et al. |
| 8,412,838 B1 | 4/2013 | Wang et al. |
| 2001/0020195 A1 | 9/2001 | Patel et al. |
| 2001/0052012 A1 | 12/2001 | Rinne et al. |
| 2001/0054044 A1 | 12/2001 | Liu et al. |
| 2001/0054147 A1 | 12/2001 | Richards |
| 2002/0002577 A1 | 1/2002 | Garg et al. |
| 2002/0022969 A1 | 2/2002 | Berg et al. |
| 2002/0029086 A1 | 3/2002 | Ogushi et al. |
| 2002/0062367 A1 | 5/2002 | Debber et al. |
| 2002/0077981 A1 | 6/2002 | Takatori et al. |
| 2002/0078015 A1 | 6/2002 | Ponnekanti |
| 2002/0080822 A1 | 6/2002 | Brown et al. |
| 2002/0083183 A1 | 6/2002 | Pujare et al. |
| 2002/0116643 A1 | 8/2002 | Raanan et al. |
| 2002/0133723 A1 | 9/2002 | Tait |
| 2002/0146026 A1 | 10/2002 | Unitt et al. |
| 2002/0146129 A1 | 10/2002 | Kaplan |
| 2002/0184224 A1 | 12/2002 | Haff et al. |
| 2002/0193966 A1 | 12/2002 | Buote et al. |
| 2003/0005118 A1 | 1/2003 | Williams |
| 2003/0005300 A1 | 1/2003 | Noble et al. |
| 2003/0009538 A1 | 1/2003 | Shah et al. |
| 2003/0023726 A1 | 1/2003 | Rice et al. |
| 2003/0033545 A1 | 2/2003 | Wenisch et al. |
| 2003/0055962 A1 | 3/2003 | Freund et al. |
| 2003/0063750 A1 | 4/2003 | Medvinsky et al. |
| 2003/0083991 A1 | 5/2003 | Kikinis |
| 2003/0084350 A1 | 5/2003 | Eibach et al. |
| 2003/0171885 A1 | 9/2003 | Coss et al. |
| 2003/0179900 A1 | 9/2003 | Tian et al. |
| 2003/0200439 A1 | 10/2003 | Moskowitz |
| 2003/0204421 A1 | 10/2003 | Houle et al. |
| 2003/0208448 A1 | 11/2003 | Perry et al. |
| 2003/0208562 A1 | 11/2003 | Hauck et al. |
| 2003/0217126 A1 | 11/2003 | Polcha et al. |
| 2003/0217166 A1 | 11/2003 | Dal Canto et al. |
| 2003/0220768 A1 | 11/2003 | Perry et al. |
| 2003/0220821 A1 | 11/2003 | Walter et al. |
| 2004/0006710 A1 | 1/2004 | Pollutro et al. |
| 2004/0022191 A1 | 2/2004 | Bernet et al. |
| 2004/0024764 A1 | 2/2004 | Hsu et al. |
| 2004/0031058 A1 | 2/2004 | Reisman |
| 2004/0049515 A1 | 3/2004 | Haff et al. |
| 2004/0107342 A1 | 6/2004 | Pham et al. |
| 2004/0107360 A1 | 6/2004 | Herrmann et al. |
| 2004/0111410 A1 | 6/2004 | Burgoon et al. |
| 2004/0142686 A1 | 7/2004 | Kirkup et al. |
| 2004/0193606 A1 | 9/2004 | Arai et al. |
| 2004/0193912 A1 | 9/2004 | Li et al. |
| 2004/0214576 A1 | 10/2004 | Myers et al. |
| 2004/0228362 A1 | 11/2004 | Maki et al. |
| 2004/0230797 A1 | 11/2004 | Ofek et al. |
| 2005/0010528 A1 | 1/2005 | Pelz et al. |
| 2005/0015624 A1 | 1/2005 | Ginter et al. |
| 2005/0027788 A1 | 2/2005 | Koopmans et al. |
| 2005/0038779 A1 | 2/2005 | Fernandez et al. |
| 2005/0132030 A1 | 6/2005 | Hopen et al. |
| 2005/0185647 A1 | 8/2005 | Rao et al. |
| 2005/0265351 A1 | 12/2005 | Smith et al. |
| 2005/0283822 A1 | 12/2005 | Appleby et al. |
| 2006/0005240 A1 | 1/2006 | Sundarrajan et al. |
| 2006/0068755 A1 | 3/2006 | Shraim et al. |

(56) References Cited

U.S. PATENT DOCUMENTS

| | | | |
|---|---|---|---|
| 2006/0075464 | A1 | 4/2006 | Golan et al. |
| 2006/0080441 | A1 | 4/2006 | Chen et al. |
| 2006/0080667 | A1 | 4/2006 | Sanghvi et al. |
| 2006/0090196 | A1 | 4/2006 | Van Bemmel et al. |
| 2006/0198394 | A1 | 9/2006 | Gotoh et al. |
| 2006/0218273 | A1 | 9/2006 | Melvin |
| 2006/0245414 | A1 | 11/2006 | Susai et al. |
| 2006/0248480 | A1 | 11/2006 | Faraday et al. |
| 2006/0248580 | A1 | 11/2006 | Fulp et al. |
| 2006/0271652 | A1 | 11/2006 | Stavrakos et al. |
| 2006/0274774 | A1 | 12/2006 | Srinivasan et al. |
| 2006/0277275 | A1 | 12/2006 | Glaenzer |
| 2006/0277591 | A1 | 12/2006 | Arnold et al. |
| 2006/0282545 | A1 | 12/2006 | Arwe et al. |
| 2006/0282876 | A1 | 12/2006 | Shelest et al. |
| 2007/0038618 | A1 | 2/2007 | Kosciusko et al. |
| 2007/0061434 | A1 | 3/2007 | Schmieder et al. |
| 2007/0113269 | A1 | 5/2007 | Zhang |
| 2007/0136317 | A1 | 6/2007 | Przywara |
| 2007/0192853 | A1 | 8/2007 | Shraim et al. |
| 2007/0271592 | A1 | 11/2007 | Noda et al. |
| 2007/0283014 | A1 | 12/2007 | Shinomiya et al. |
| 2007/0294762 | A1 | 12/2007 | Shraim et al. |
| 2007/0299915 | A1 | 12/2007 | Shraim et al. |
| 2008/0005779 | A1 | 1/2008 | Takenaka et al. |
| 2008/0008202 | A1 | 1/2008 | Terrell et al. |
| 2008/0215889 | A1 | 9/2008 | Celik et al. |
| 2009/0158384 | A1 | 6/2009 | Kanade et al. |
| 2009/0210364 | A1 | 8/2009 | Adi et al. |
| 2010/0037284 | A1 | 2/2010 | Sachs |
| 2010/0223222 | A1 | 9/2010 | Zhou et al. |
| 2010/0235879 | A1 | 9/2010 | Burnside et al. |
| 2011/0280215 | A1 | 11/2011 | Nakagawa et al. |
| 2012/0051529 | A1 | 3/2012 | Dobbins et al. |
| 2012/0096513 | A1 | 4/2012 | Raleigh et al. |
| 2012/0304277 | A1 | 11/2012 | Li et al. |

FOREIGN PATENT DOCUMENTS

| | | |
|---|---|---|
| EP | 1 418 730 | 5/2004 |
| EP | 1 641 215 | 3/2006 |
| JP | 06-097905 | 4/1994 |
| JP | 11-205388 | 7/1999 |
| JP | 2001-306521 | 11/2001 |
| JP | 2003-008651 | 1/2003 |
| WO | WO-01/33759 | 5/2001 |
| WO | WO-01/38995 | 5/2001 |
| WO | WO-02/079949 | 10/2002 |
| WO | WO-2005/066737 A1 | 7/2005 |

OTHER PUBLICATIONS

International Search Report for International Application No. PCT/US2008/007984; Completed Aug. 22, 2009; Mailed Sep. 3, 2009.
Office Action Dated Jun. 13, 2006, for U.S. Appl. No. 10/423,444, filed Apr. 25, 2003.
Office Action Dated Mar. 12, 2007, for U.S. Appl. No. 10/423,444, filed Apr. 25, 2003.
Action Dated Sep. 7, 2007, for U.S. Appl. No. 10/423,444, filed Apr. 25, 2003.
Office Action Dated Mar. 14, 2008, for U.S. Appl. No. 10/423,444, filed Apr. 25, 2003.
Office Action Dated Sep. 19, 2008, for U.S. Appl. No. 10/423,444, filed Apr. 25, 2003.
Office Action Dated Dec. 2, 2008, for U.S. Appl. No. 10/423,444, filed Apr. 25, 2003.
Office Action Dated Feb. 25, 2009, for U.S. Appl. No. 10/423,444, filed Apr. 25, 2003.
International Search Report for International Application No. PCT/US2004/043405; Completed Mar. 15, 2005; Mailed Mar. 23, 2005.
Darryle Merlette, Dr. Parag Pruthi; Network Security; NetDetector: Identifying Real Threats and Securing Your Network; Copyright © 2003 Niksun, Inc., Monmouth Junction NJ, USA.
Darryle Merlette; Spencer Parker, Dr. Parag Pruthi; Niksun Network Security; NetDetector: Monitoring and Minimizing Instant Messaging Risks; Copyright © 2003 Niksun, Inc., Monmouth Junction NJ, USA.
Japanese Office Action on 2006-547397 dated Nov. 30, 2010.
Japanese Office Action on 2006-547397 dated Jul. 5, 2011.
Scarfone et ai, Guide to Intrusion Detection and Prevention Systems (IOPS), Feb. 2007, NIST, Special Publication 800-94.
Office Action on U.S. Appl. No. 10/583,578 dated Jun. 24, 2010.
Office Action on U.S. Appl. No. 10/583,578 dated Feb. 11, 2011.
Office Action on U.S. Appl. No. 10/583,578 dated Jul. 19, 2011.
Office Action on U.S. Appl. No. 12/267,804 dated Aug. 16, 2011.
Office Action on U.S. Appl. No. 12/267,804 dated Apr. 25, 2011.
Office Action on U.S. Appl. No. 12/270,278 dated Jun. 24, 2011.
Office Action on U.S. Appl. No. 12/406,613 dated Oct. 24, 2011.
Notice of Allowance for U.S. Appl. No. 10/583,578 dated Mar. 27, 2012.
Notice of Allowance for U.S. Appl. No. 10/423,444 dated Nov. 16, 2009.
Office Action for U.S. Appl. No. 12/270,278 dated Nov. 9, 2011.
Office Action for U.S. Appl. No. 12/267,804 dated Apr. 10, 2012.
Office Action for U.S. Appl. No. 12/267,850 dated Nov. 7, 2012.
Office Action for U.S. Appl. No. 12/267,850 dated Jun. 14, 2012.
Office Action for U.S. Appl. No. 12/406,613 dated Mar. 20, 2012.
Office Action for U.S. Appl. No. 12/432,186 dated Jun. 25, 2012.
Office Action for U.S. Appl. No. 10/423,444 dated Jul. 27, 2009.
US Notice of Allowance for U.S. Appl. No. 12/267,804 dated Apr. 24, 2013.
US Office Action for U.S. Appl. No. 12/270,278 dated Feb. 20, 2014.
US Office Action for U.S. Appl. No. 12/267,804 dated Sep. 27, 2012.
US Office Action for U.S. Appl. No. 12/267,850 dated Mar. 26, 2013.
US Office Action for U.S. Appl. No. 12/267,850 dated Sep. 30, 2013.
US Office Action for U.S. Appl. No. 12/406,613 dated Jun. 9, 2014.
US Office Action for U.S. Appl. No. 12/432,186 dated Feb. 21, 2013.
Written Opinion of the International Search Authority for PCT Application No. PCT/US2004/043405; Completed Mar. 15,2005; Mailed Mar. 23, 2005.

* cited by examiner

FIG. 15C

| 1810a | 1810b | 1810c | 1810d | 1810e | 1810f |
|---|---|---|---|---|---|
| Message Version | Client Version | Client ID | Client OS | Login Name (Variable) | Password (Variable) |
| Domain (Variable) | Hardware ID | Client IP Address | Maximum Key Size | Key Algorithms Supported | Context |
| 1810g | 1810h | 1810i | 1810j | 1810k | 1810l |

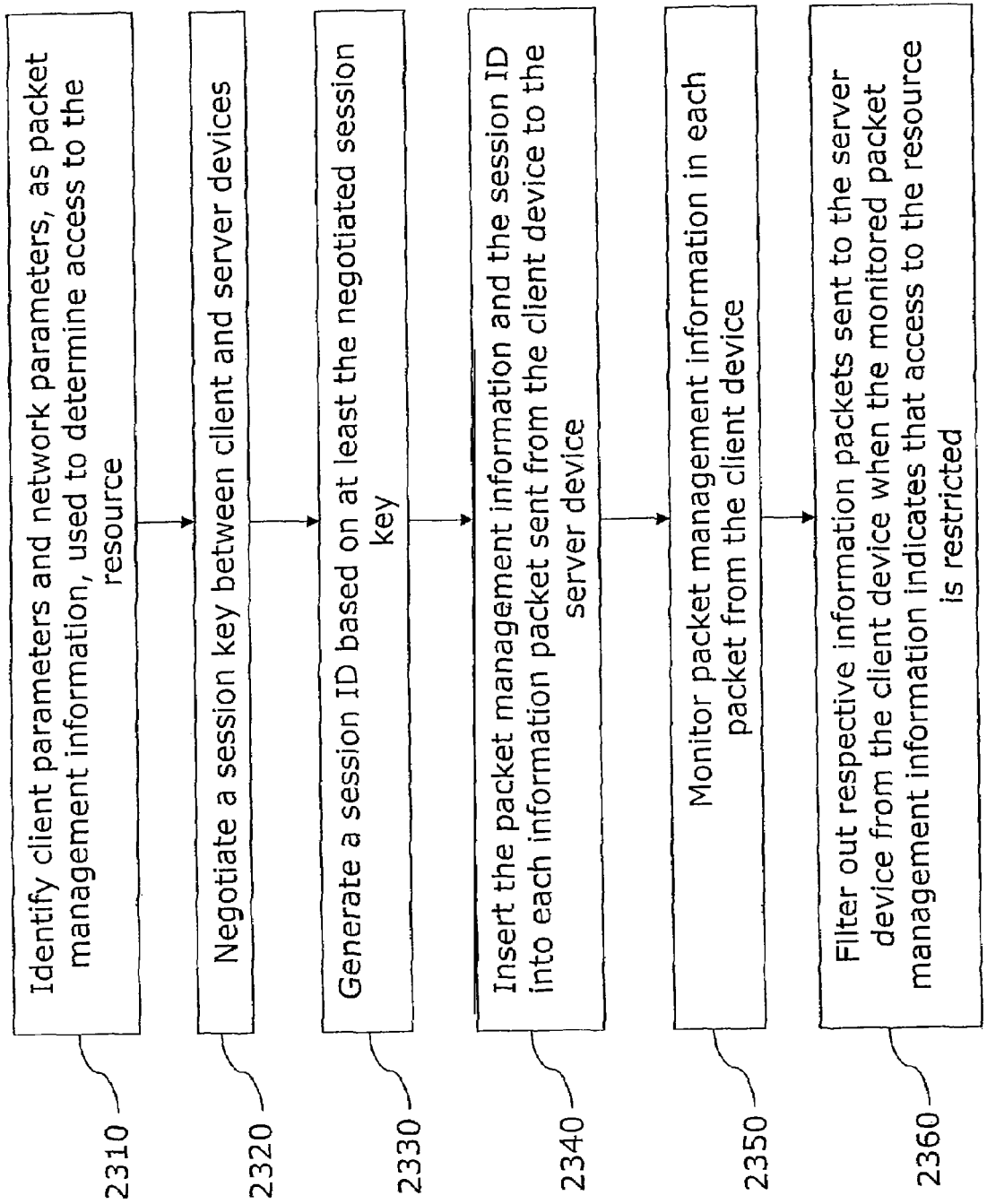

COMPUTER SECURITY SYSTEM

CROSS REFERENCE TO RELATED APPLICATIONS PATENT

This Application claims the benefit of is a Continuation-in-Part of U.S. application Ser. No. 10/423,444, filed Apr. 25, 2003 now U.S. Pat. No. 7,644,434 and is a non-provisional of each of U.S. Provisional Application No. 60/937,470, filed Jun. 28, 2007, U.S. Provisional Application No. 60/375,326, filed Apr. 25, 2002, U.S. Provisional Application No. 60/375,362, filed Apr. 25, 2002 and is a continuation-in-part of U.S. application Ser. No. 10/583,578, filed Mar. 37, 2007, nationalized from PCT Application No. PCT/US2004/043405, filed on Dec. 22, 2004, which claims the benefit of and priority to U.S. Provisional Application No. 60/533,769 filed Dec. 31, 2003, the contents of which are herein incorporated by reference.

FIELD OF THE INVENTION

This invention relates to computer system security and, more particularly, to a system and method for improved security in packet communication systems.

BACKGROUND OF THE INVENTION

It is often desirable to control the accessibility of computer system resources that are accessible directly or through networks such as LANs, WANs, and the Internet. Recently, security and access concerns have grown as malicious trespasses have increased the desirability to have improved access control. Further, the heightened state of awareness related to threats of cyber terrorism make the desire to reduce existing vulnerabilities greater than ever before.

SUMMARY OF THE INVENTION

In an exemplary embodiment of the present invention, a method of providing access to an authenticated user, and restricting access to an unauthorized user, of a computer system, is provided. The method includes determining whether a user is authenticated to access at least one resource included in the computer system. The method also includes establishing a session (or a client ID) and a session identifier such that the user has access to the resource if the user is authenticated to access the resource. The method also includes changing the session identifier each time the user completes an interaction with the computer system during the session.

In another exemplary embodiment of the present invention, a computer system is provided. The computer system includes a microprocessor and a computer readable medium. The computer readable medium includes computer program instructions which cause the computer system to implement the above-described method of providing access to an authenticated user and restricting access to an unauthorized user of the computer system.

In another exemplary embodiment of the present invention, a method of packet management for restricting access to a resource of a computer system. The method includes identifying client parameters and network parameters, as packet management information, used to determine access to the resource, negotiating a session key between client and server devices, generating a session ID based on at least the negotiated session key, inserting the packet management information and the session ID into each information packet sent from the client device to the server device, monitoring packet management information in each information packet from the client device, and filtering out respective information packets sent to the server device from the client device when the monitored packet management information indicates that access to the resource is restricted.

BRIEF DESCRIPTION OF THE DRAWINGS

The invention is best understood from the following detailed description when read in connection with the accompanying drawings. It is emphasized that, according to common practice, various features/elements of the drawings may not be drawn to scale. Moreover in the drawings, common numerical references are used to represent like features/elements. Included in the drawing are the following figures:

FIG. 15C is a schema illustrating an exemplary login request of FIG. 15B message;

FIG. 20 is a flow chart illustrating a method of packet management in accordance with yet another exemplary embodiment of the invention.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

PCT patent application filed on Dec. 15, 2004, entitled "COMPUTER SECURITY SYSTEM" (PCT/US04/41958) relates to computer system security, and is incorporated by reference herein in its entirety. PCT patent application entitled "METHOD AND SYSTEM FOR DELEGATING ACCESS TO COMPUTER NETWORK RESOURCES" (PCT/US04/43406) also relates to computer system security, and is incorporated by reference herein in its entirety.

Further, conventional virtual private networks (i.e., VPNs) and firewalls allow access holes to exist. Spoofing and other cracker techniques can enter through these holes resulting in a threat to data integrity. This creates a significant level of exposure which hackers, crackers, and criminals can and do exploit.

Third party solutions exist through which information technology (IT) organizations manage their community of legitimate access; however, because these are added as point solutions on top of an existing IT structure, various global access security issues are not resolved.

Most specifically, there exists a vulnerability in existing firewalls at the transaction level. Most security solutions focus on encrypting data or authenticating access; however, the system (e.g., a computer server) is vulnerable during the time when the transactions are taking place. While transactions are in process, applications must maintain state, similar to the continually maintained state when two people talk on a telephone network. While transactions are in process, enterprise systems are susceptible to break-ins, much like a telephone wiretap break-in.

Figure 1:
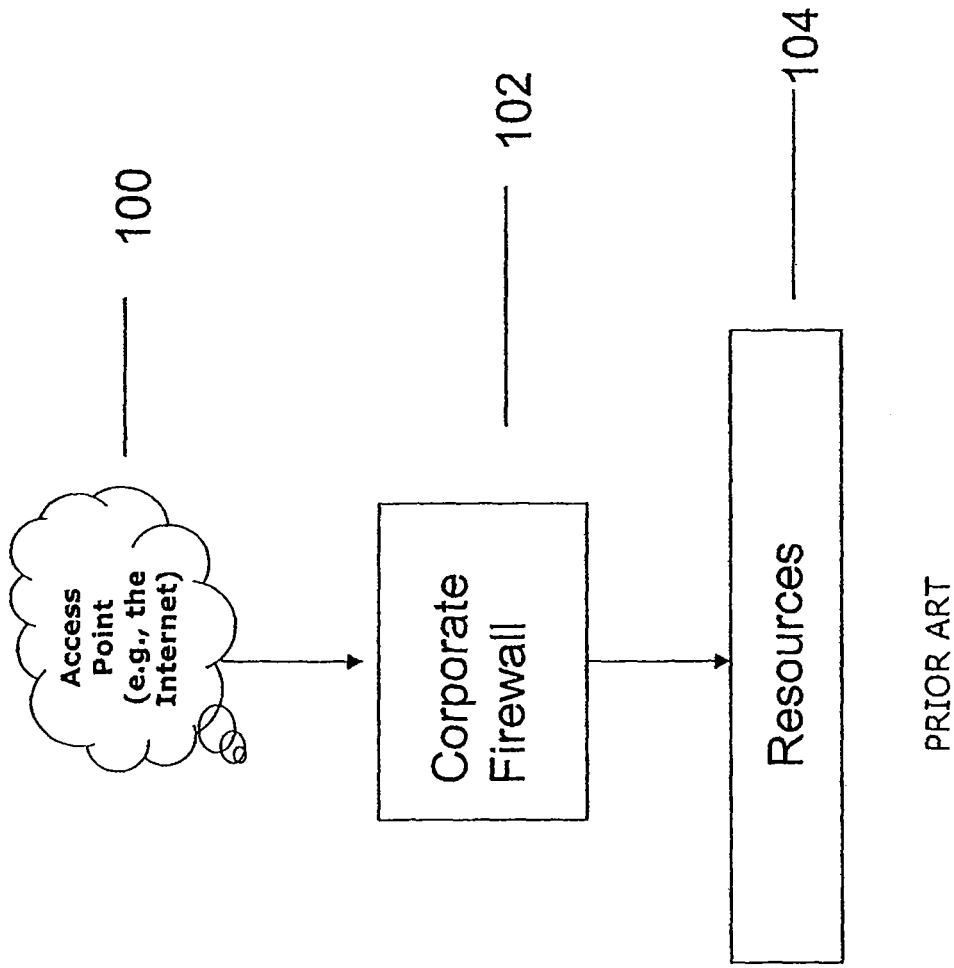
FIG. 1 is a block diagram illustrating a conventional security system.

FIG. 1 is a block diagram illustration of a conventional protection system. A user desires to obtain access to resource 104 using access point 100. Resource 104 may be an application or port on a computer server or computer network. Further, access point 100 may be, for example, an Internet connection or a network connection. Between access point 100 and desired resource 104 is firewall 102, for example, a corporate firewall.

Establishing a connection through firewall 102 may be accomplished, for example, using a user ID and/or a password. After the connection is established, the user may access resource 104; however, resource 104 (and possibly other data on the computer server or network) is vulnerable to unauthenticated access through the legitimate connection established by the user through access point 100.

Another drawback to existing security systems such as VPNs (i.e., Virtual Private Networks), firewalls, and proxy servers is that they typically require proprietary bundled hardware and software.

A key to restricting access to network resources is the ability to distinguish between different users once they have been identified. Conventional methods involve creating a session identifier for a user once the user has been identified. If the client-server application is capable, the session identifier may be embedded in the application data that is sent back and forth between the client and server. One example of this is embedding a cookie in a web browser. Unfortunately, many applications were never designed to handle session identifiers and cannot practically be made to accommodate session identifiers. For such applications, present solutions relate to using the session identifier from the network address of the client. Unfortunately, network addresses are often overridden by network gateways, and as such, the reliability of this identifying information is substantially diminished.

Through the various exemplary embodiments disclosed herein, a security system for information is provided. Additionally, methods of providing access to information, and restricting access to information, using the security system, are also disclosed. The disclosed invention is particularly suited to the security of remotely accessed network environments through a network connection though directly accessed computers are contemplated as well.

When used in conjunction with a network, the security system controls remote user access to the network (or any resource in the network) by way of, for example, a URL and/or any other access user interface. The security system acts as an umbrella over the remotely accessed network. A user of the network logs into the network before any content is accessible, or before the user may access network resources or applications (e.g., computer programs used by the user to perform some task) hosted within the network. The information stored on the user's computer after log in includes a session ID (e.g., a generic unique identifier which is used to maintain state between a client computer and a server computer over a stateless connection). The session ID contains a number or other indicia corresponding to the user's session (e.g., an invisible entity which maintains state between a client computer and a server computer).

In one embodiment, because the user can only view the origination URL, nothing within the network is exposed to the user prior to sign on (e.g., sign on enables the user to sign in once and be automatically signed into other applications when the user uses them) to the web server (e.g., a server that hosts both static and dynamic web pages). As such, after log in, if a user has permission to access resources/applications on the network, encrypted addresses to the application servers (e.g., servers that allow users to run applications residing on the server from a remote location) that include the desired resources/applications are sent to the user. This protects the addresses of application servers from being published to the entire Internet (or an access community) and substantially reduces the possibility of intrusion into the remotely accessed network.

The security system of the present invention may include a number of features to ensure that once a user (i.e., the person accessing an object) is logged in, the user only has access to what he/she has been granted access to. For example, in certain embodiments, the security system controls access to resources based on information related to user identity, group identity, permissions (i.e., rules permitting access to perform a specific action on an object), and objects (i.e., an entity that can have actions performed on it by a user). Users belong to a group, and users and groups are given permissions to access objects.

Further, a page, application, web service, or document may be used to accomplish this delegation of access privileges. Permissions to access objects are assigned to a user or to a group for an object by relating the user, group, and object together. A record giving a user access to an object may include, for example, a permission ID, a user ID (i.e., a unique identifier representing a single user), and an object ID (i.e., a unique identifier representing any object which can have permissions associated with it). Similarly, to grant a group of users the same permission, the record may contain the permission ID, the group ID (i.e., a unique identifier representing a single group of users), and the object ID. In the same way a user belongs to a group, a record exists that relates a user ID to a group ID. This allows permission to access an object to be granted to a group or to a user, while at the same time requiring permission to be granted in order for the access to be permitted.

According to aspects of the present invention, when a user attempts to access a protected object, a number of actions take place to determine what the user is permitted to do to an object. On any object and for any action, the system may first check to determine the group that the current user belongs to, and the relationship of the group to the permissions required to perform the desired action. If this check is not successful, the system may continue to determine if the user is related to the permission required to perform the action. If neither of the above cases is true, the user is denied access. If one or both cases are true, the action is performed. For example, the action could include viewing an object, modifying the content of an object, approving an object, creating an object, or deleting an object.

The security system of the present invention may use cookies and a unique ID known as a session ID to maintain state with a user over a normal connection, such as a HTTP (i.e., Hyper Text Transport Protocol) connection or a secure socket layer connection (i.e., a standard connection for communicating securely over the Internet in which all communications are encrypted using a high level of encryption). After logging into the security system a dynamic session ID is assigned that corresponds to the user, and the session ID may be stored on the client computer in the form of a cookie. The session ID cookie exists, unless dynamically changed through the completion of an interaction, until the user closes the current browser window.

A timeout feature may also be provided whereby the expiration of a predetermined period of inactivity is used to determine when the session (and the session ID) should be terminated. During the user's session, the inactivity/timeout period is continually updated. The timeout period is set in the database and if the user does not perform an action/interaction within the predetermined timeout period, the session is terminated by removing the session from a database server (i.e., a server which stores and provides access to large amounts of data efficiently). This allows a high level of security because no meaningful information is stored on the user's computer. Further, even if someone does gain access to the user's computer, after the timeout period has expired, any information that might be stored in a cookie on the user's computer is no longer valid.

In certain embodiments of the invention, after the user has logged in, a number of checks may take place each time the user moves within the system in order to determine what resources the user can access. For example, the security system determines the identity of the user accessing the system. The session may be validated by checking the user ID against the database. If a session ID does not exist, the session is invalid, and the user is forced to log in before accessing the system. If the session ID does exist, the system retrieves the associated user ID and continues to perform whatever actions are necessary to finish displaying the approved information.

Through various exemplary embodiments, the process of accessing a resource (e.g., an application) on a remote server begins with the user logging into the security system (e.g., logging in using single sign on software that logs the user directly into the security system). Once logged in, the user can click links to applications hosted on the application server and view objects. This takes the user to a URL which hosts a component (i.e., a compiled application which can be made accessible to a script within the web browser) that connects to the application server, and the user is also provided with a unique token that provides a single use link to the application server. Another component of the system connects back to the web server with the token and retrieves the connection information for the application server. This component provides the retrieved information back to the application server client component which then connects to the application server. The application server then displays all objects and applications approved for the user.

The security system described herein may include an architecture that utilizes common programming languages. This security system contemplates the desire to provide secure access to all remote applications, software, and content. The security system also contemplates and provides embodiments that do not require an install of the services on the remote users device.

By utilizing common industry standards, the security system architecture can provide an efficient and meaningful security solution without the overhead of extra or robust hardware. As illustrated herein, the security system architecture can operate with any number of application services or terminal services installed either on the local physical server, or in a configuration utilizing outside objects from remote servers or locations. By aggregating these objects the end user is provided with desirable services defined by their current role in one location with a reduced investment in hardware. This architecture allows for different and interchangeable service delivery options. The system provides the end user with access to the services for which they have been granted access. As such, a more productive end user specific service is provided that, while unique to each and every user, also contemplates and mitigates the security risks associated with remote access to a multiple user network (e.g., a corporate network).

Various embodiments of the security system may be implemented in a number of mediums. For example, the system can be installed on an existing computer system/server as software. Further, the system can operate on a stand alone computer system (e.g., a security server) that is installed between another computer system (e.g., an application server) and an access point to the another computer system. Further still, the system may operate from a computer readable carrier (e.g., solid state memory, optical disc, magnetic disc, radio frequency carrier medium, audio frequency carrier medium, etc.) that includes computer instructions (e.g., computer program instructions) related to the security system.

Referring to the figures generally, in an exemplary embodiment of the present, a method of providing access to an authenticated user, and restricting access to an unauthorized user, of a computer system, is provided. The method includes a step 300 of determining whether a user is authenticated to access at least one resource included in the computer system. The method also includes a step 302 of establishing a session and a session identifier such that the user has access to the at least one resource if the user is authenticated to access the at least one resource. The method also includes a step 304 of changing the session identifier each time the user completes an interaction with the computer system during the session.

In another exemplary embodiment of the invention, a computer system is provided. The computer system includes a microprocessor and a computer readable medium. The computer readable medium includes computer program instructions which cause the computer system to implement the above-described method of providing access to an authenticated user and restricting access to an unauthorized user of the computer system including steps 300, 302, and 304.

In yet another exemplary embodiment of the invention, a computer readable carrier including computer program instructions is provided. The computer program instructions cause a computer system to implement the above-described method of providing access to an authenticated user and restricting access to an unauthorized user of the computer system including steps 300, 302, and 304.

Figure 2:
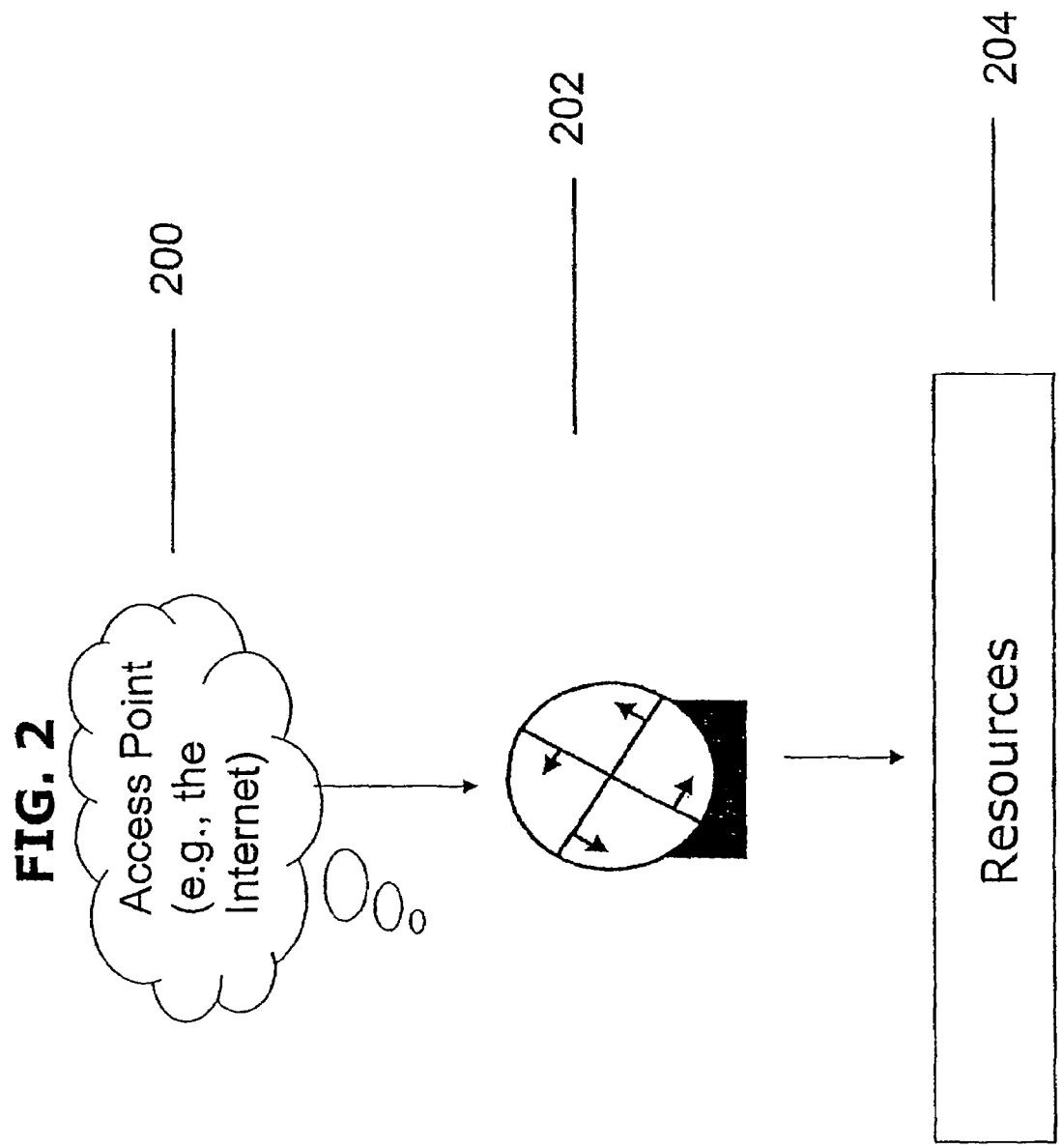
FIG. 2 is a block diagram illustrating a security system in accordance with an exemplary embodiment of the invention.

Referring now to FIG. 2, a block diagram of a computer security system in accordance with an exemplary embodiment of the invention is illustrated. In FIG. 2, a user desires to access resource 204 via access point 200. For example, resource 204 may be an application, data file, or any other data stored on a computer system, a computer server, or a network. Access point 100 may be an Internet connection, or any other direct or indirect connection to the system (e.g., a network connection).

Access point 200 is connected to resource 104 through "revolving door" 102. Revolving door 202 is a visualization of a component that distinguishes various exemplary embodiments of the invention from traditional session management systems. As opposed to issuing a session ID to a user that is carried for the duration of the connection with the system (e.g., computer device, server, OS, etc.) the user is granted a session ID that dynamically changes with each interaction with the system. Revolving door 202 can be visualized as being in the firewall, and as such, the revolving door approach described herein provides security for transactions at the session and port level within the firewall.

As used herein, the term interaction is meant to define any of a number of actions that a user may cause with the host computer system. For example, an interaction may be a mouse-click, a keystroke, or may even relate to movement of the mouse. As such, an interaction between the user and the computer system may be any action by the user through an input/output device (e.g., mouse, keyboard, joystick, video device, audio device, touch device, etc.).

As used herein, the term computer system is meant to define any of a number of computer systems or microprocessor based devices. For example, a computer system may be a personal computer, a mainframe computer, a computer server system, a computer network, a PDA, an appliance that is microprocessor based, etc.

Additionally, the session management system discussed herein may also include a timeout limit for a session. In such an embodiment, if an interaction does not occur between the user and the computer system (or a resource on the computer system) within a specified time, the existing session ID is eliminated and the user is required to re-authenticate him or herself.

More specifically, a user may connect to the computer system by way of access point 200, where access point 200 is a client or a clientless (e.g., a web browser) interface. For example, a user wishing to access a resource on a computer system is challenged with a request for authentication. This authentication data provided by the user may be referenced against a data source (e.g., external to the computer system, internal to the computer system, or included on another memory source) that may include the credentials of this specific user. If the user is validated against the data source, the user is assigned a unique identifier and a session ID is generated. In an exemplary embodiment, the session ID and the unique identifier have continuity (mathematically match up) at all times or the user will lose the established connection. In the event that the established connection is terminated, the user may be redirected to the authentication area of the system. The session ID changes with each and every interaction (e.g., each click of the mouse). Because the session ID is dynamic in nature, an extra level of security is added to the protected resource on the computer system.

Each time the user completes an interaction with the computer system, the session ID changes, and the unique identifier is again referenced by way of a reference check made to the data source. The resulting correlation of the session ID, the unique user identifier, and the data source information (client ID) provides the system with a positive or negative result to either grant the user continued access (by continually providing updated session IDs) or to force the user to re-authenticate with the computer system.

The unique user identifier and the dynamic session ID may be generated, for example, using a process by which a unique, random number or other indicia is generated. For example, a unique, random number may be generated using a random number generator, or by using a unique logarithmic code generation method.

The data referenced in the data source may also be generated using the processes described above in relation to the unique user identifier and the session ID (i.e., random number generator, logarithmic code, etc.). Further, the data referenced in the data source may also be provided a third party authentication system. The process used to match up the unique user identifier and the session ID with the data source queries is accomplished using a cross reference process where all three key components are matched, whereby a positive or negative result is generated for the particular transaction.

The timeout process described above may be accomplished by checking the last received transaction of the user against a set timeout period. When a communication is received, the system checks to see if the time elapsed between communications with the current user is greater than the predetermined timeout period. If the calculated time exceeds the timeout period, the communication with the computer system is blocked, the established session is destroyed, and the user must re-authenticate before being permitted to access any resources on the computer system.

Figure 3:
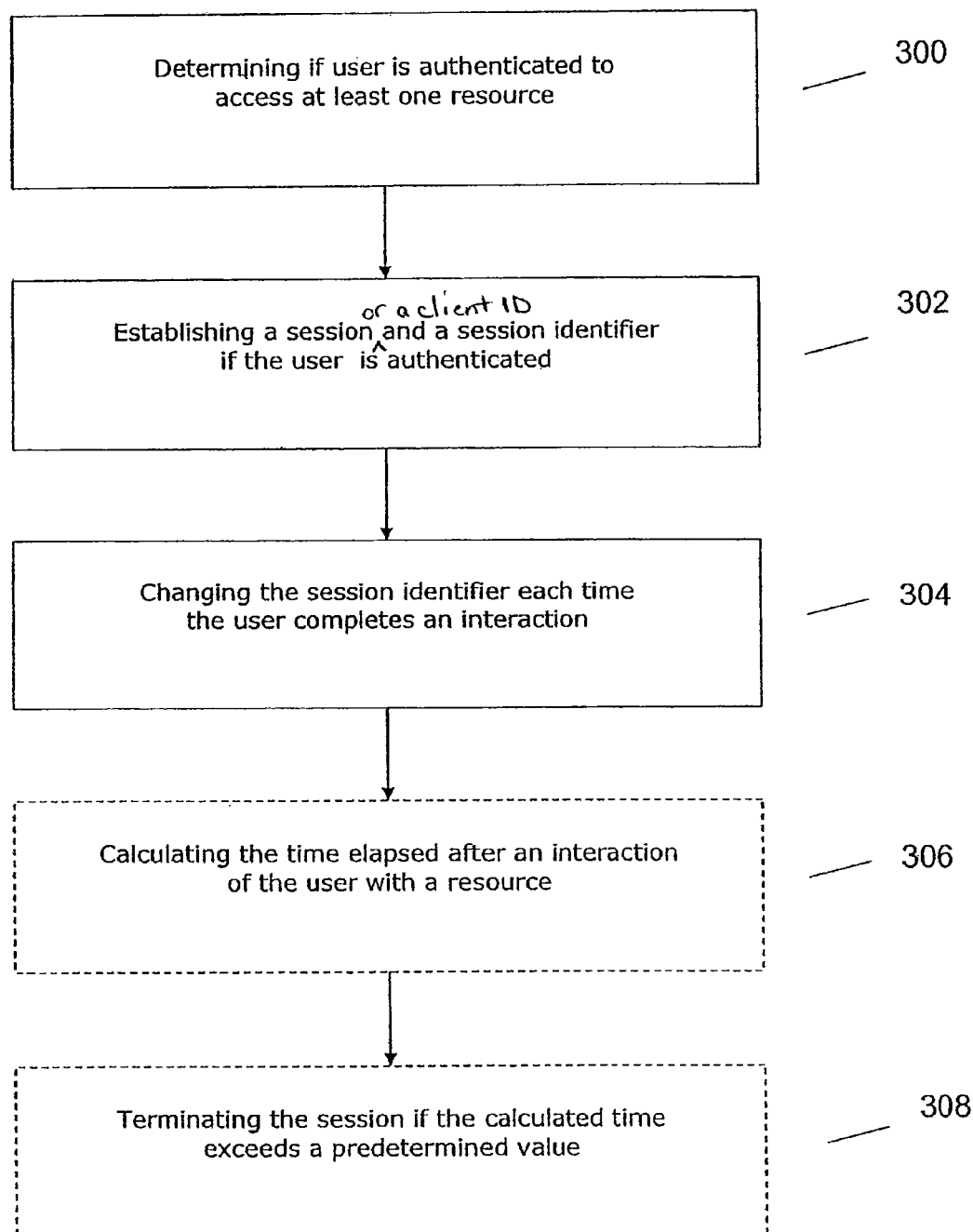
FIG. 3 is a flow diagram illustrating a method of providing and restricting access to at least one resource on a computer system in accordance with an exemplary embodiment of the invention.

FIG. 3 is a flow diagram illustrating a method of providing access to an authenticated user, and restricting access to an unauthorized user, of a computer system. At step 300, a determination is made as to whether a user is authenticated to access at least one resource included in the computer system. If the user is authenticated at step 300, a session and a session identifier are established at step 302 such that the user has access to the at least one resource in the computer system. At step 304, the session identifier changes each time the user completes an interaction with the computer system during the session. At optional step 306, the time after an interaction between the user and the computer system, but before another interaction, is calculated. If the calculated time exceeds a predetermined value, the session is terminated at optional step 308.

Figure 4:
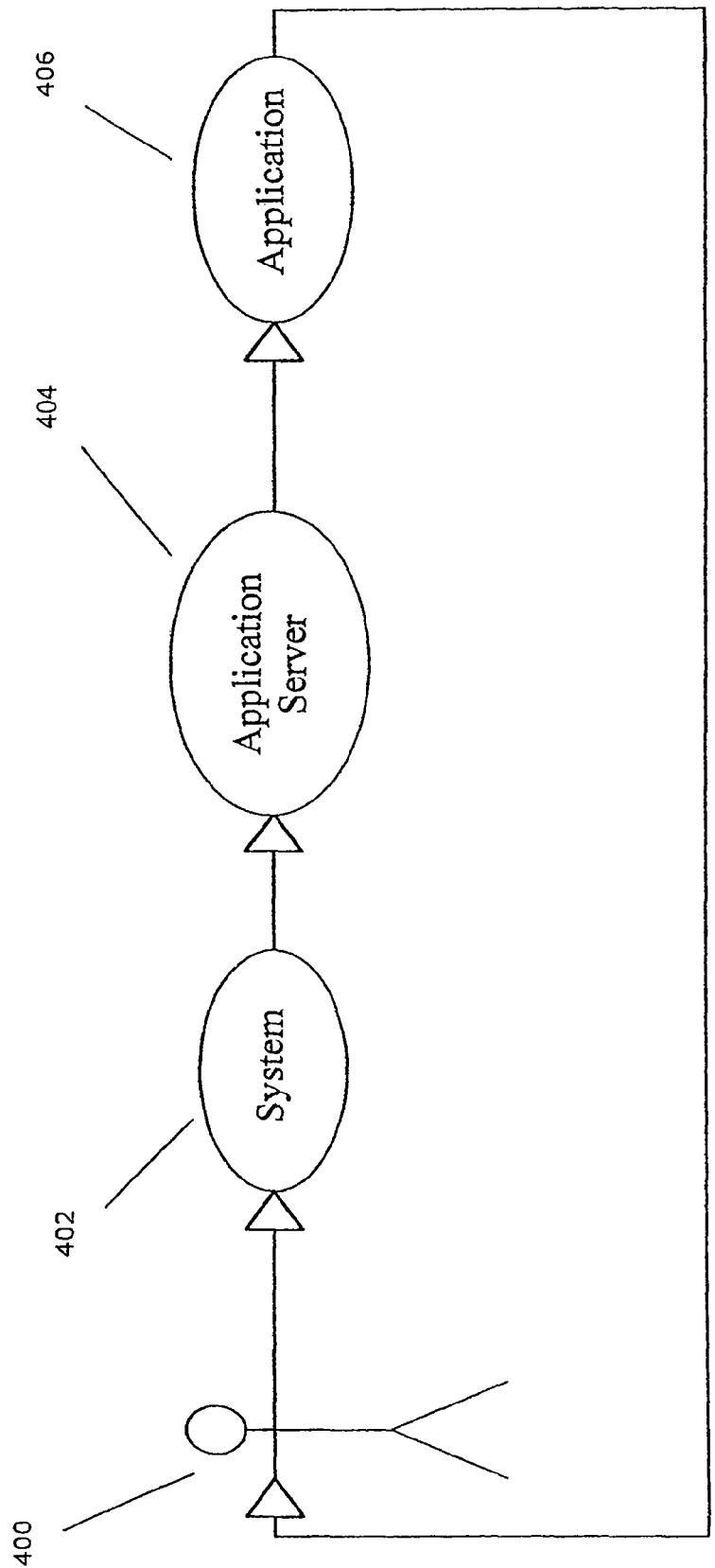
FIG. 4 is a block diagram illustrating a connection between a user and an application in accordance with an exemplary embodiment of the invention.

FIG. 4 is a block diagram illustrating an exemplary embodiment of the invention through which a connection between a user 400 and an application 406 is established. User 400 is able to use security system 402 by connecting to security system 402 and performing an authentication process. Until the authentication process is complete, user 400 can not access application server 404 or the desired application 406. Once the user has connected to system 402 and completed the authentication process, security system 402 accesses application server 404, thereby permitting the user to access application 406 using a client component, that is specific to application server 404, on his/her computer.

According to an exemplary embodiment of the invention, user 400 uses a web browser (not illustrated) to connect to security system 402. According to another embodiment, user 400 may utilize a specialized client which handles interactions with security system 402, where the specialized client authenticates user 300 without requesting login information from the user. For example, the specialized client may use information that is gathered from the user when the user logs into his/her own system. In such an embodiment, it is also possible to use an application client (i.e., an application that runs on the client computer, connects directly to the application server, and allows the client to use the applications available on the application server) rather than a component to access the applications (e.g., application 406) on application server 404. An application client is different from an application component in that an application component is run in a web browser, where an application client may execute freely from a web browser.

Figure 5:
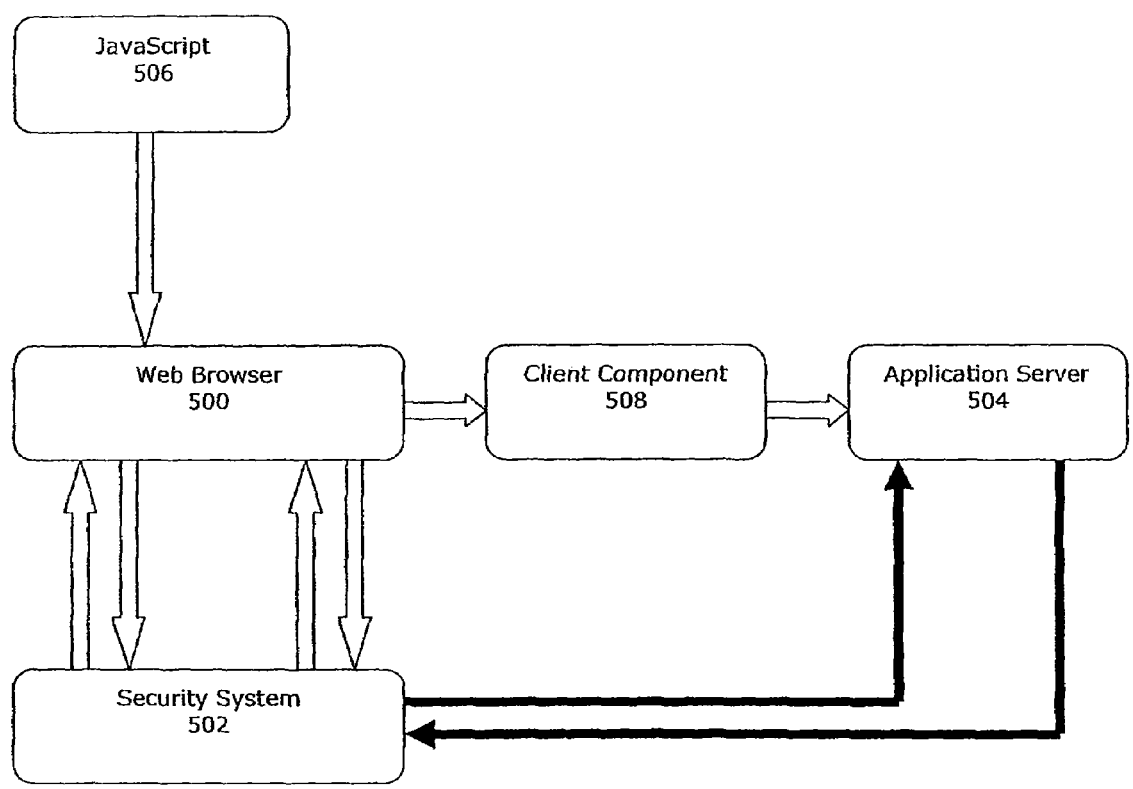
FIG. 5 is a block diagram of an application security model in accordance with an exemplary embodiment of the invention.

FIG. 5 is a block diagram illustrating an exemplary application security model. The application security model illustrates how a resource (e.g., an application) on an application server can be protected from unauthorized access using an embodiment the security system of the invention. Using web browser 500, a client who desires to access a resource on application server 504 connects to security system 502 to request the desired resource. Security system 502 connects to application server 504 to determine if the user has authorized access to the desired resource. Application server 504, through a connection to security system 502, validates that the user has access to the resource. Security system 502 then sends the information used to open the application to web browser 500 (e.g., a single use token and an application page to the client through web browser 500).

The client requests application connection information from security system 502 using the single use security token. Security system 502 removes the valid single use token from a list of valid tokens and sends the requested connection information back to the client at web browser 500 in the form of a script such as a JavaScript 506 (i.e., a script that is run by the web browser, that is, the client tool used to view web pages to perform a specific task). JavaScript 406, for example, sets values in web browser 500 that are needed to connect to application server 504. Script 506 may alternatively be, for example, an HTML script, an XML script, or any other type of script. JavaScript 506 instructs the client through web browser 500 to establish a connection to application server 504. Client component 508, within web browser 400, connects to application server 504 and displays the requested resource such as an application (e.g., loads the application in the client's browser window).

As described above, the client could be a web browser (e.g., web browser 500), or could be a client that handles the authentication to the web server. In such an embodiment, the client automatically logs the user into system 502 using information obtained when the user logged into his/her computer. The user can then use a client application that does not need to viewed in a web browser to connect to resources on application server 504.

Figure 6:
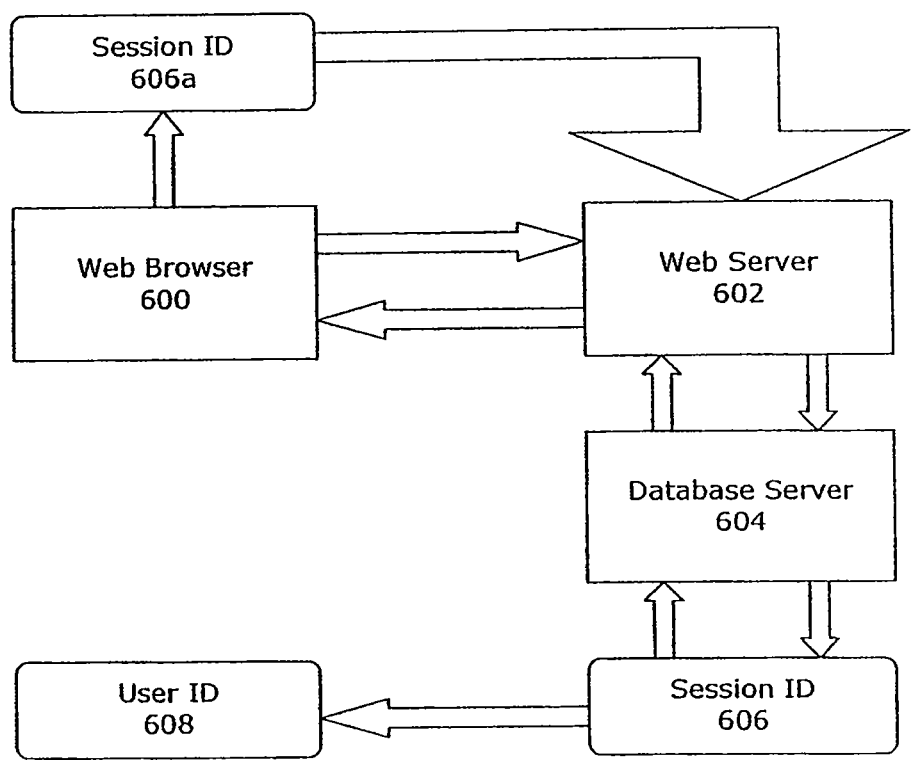
FIG. 6 is a block diagram illustrating data flow of a session based security system in accordance with an exemplary embodiment of the invention.

FIG. 6 is a block diagram session based security model illustrating how various elements related to the security system of the invention interact with each other. In the embodiment illustrated in FIG. 6, the security system is built into web server 602. A user uses a client (e.g., web browser 600) to request a resource such as a document (e.g., that is accessible via a URL) from web server 602. The security system, built into web server 602, checks to see if the user is presently logged in. If the user is not logged in, a login page is returned to the user (through web browser 600) by web server 602. The user, through web browser 600, fills out the login form and submits it back to the security system built into web server 502. The security system then authenticates the user, and creates a unique session identifier 606 (i.e., session ID) for the user, and stores session ID 606 in database server 604. Session ID 606 is also associated with a user specific identifier, user ID 608.

The security system then sends the user, through web browser 600, a web page (i.e., a graphical page of information that is displayed by a web browser) containing the requested content (a resource such as an application) as well as a cookie containing session ID 606. Once the user, with user ID 608, has been authenticated and assigned session ID 506, every request that the user makes to the web server 602 using web browser 600 contains the last session ID 606 (e.g., in the form of a cookie) that was associated with user ID 608.

At the next transaction, the security system, built into web server 602, compares session ID 606a with the session ID 606 stored in database server 604 in order to verify, through user ID 608, that the user has been authenticated. The security system then compares the last time the user accessed the server to the current time to determine if session ID 606 has expired.

In an exemplary embodiment of the invention, a session ID expires if 15 minutes have elapsed since the last time the user accessed the server (i.e., since the last interaction). If session ID 606, as well as the corresponding session, has expired, web server 602 sends the login page back to the user through web browser 600. If session ID 606 has not expired, web server 602 creates a new session ID 606 to send to the user through web browser 600. This new session ID will be sent to the user through web browser 600 with the next response from web server 602.

In the exemplary embodiment of the invention illustrated in FIG. 6, web server 602 could be any type of server, for example, a network server. Web browser 600 could be a specialized network client designed to handle session ID 606, and to automatically pass session ID 606 on to the security system, built into web server 602.

As opposed to web browser 600 (i.e., the actual client application) illustrated in FIG. 6, in embodiments where another type of network server is utilized, a client application specific to that network server could be used as the client (assuming that either a web browser or specialized client were used to perform the authentication and to maintain the session).

As opposed to being built into web server 602 as illustrated in FIG. 6, the security system could be a separate computer system between the client (e.g., web browser 600) and web server 602. Further still, the security system could be a separate server on the same machine as web server 602.

Figure 7:
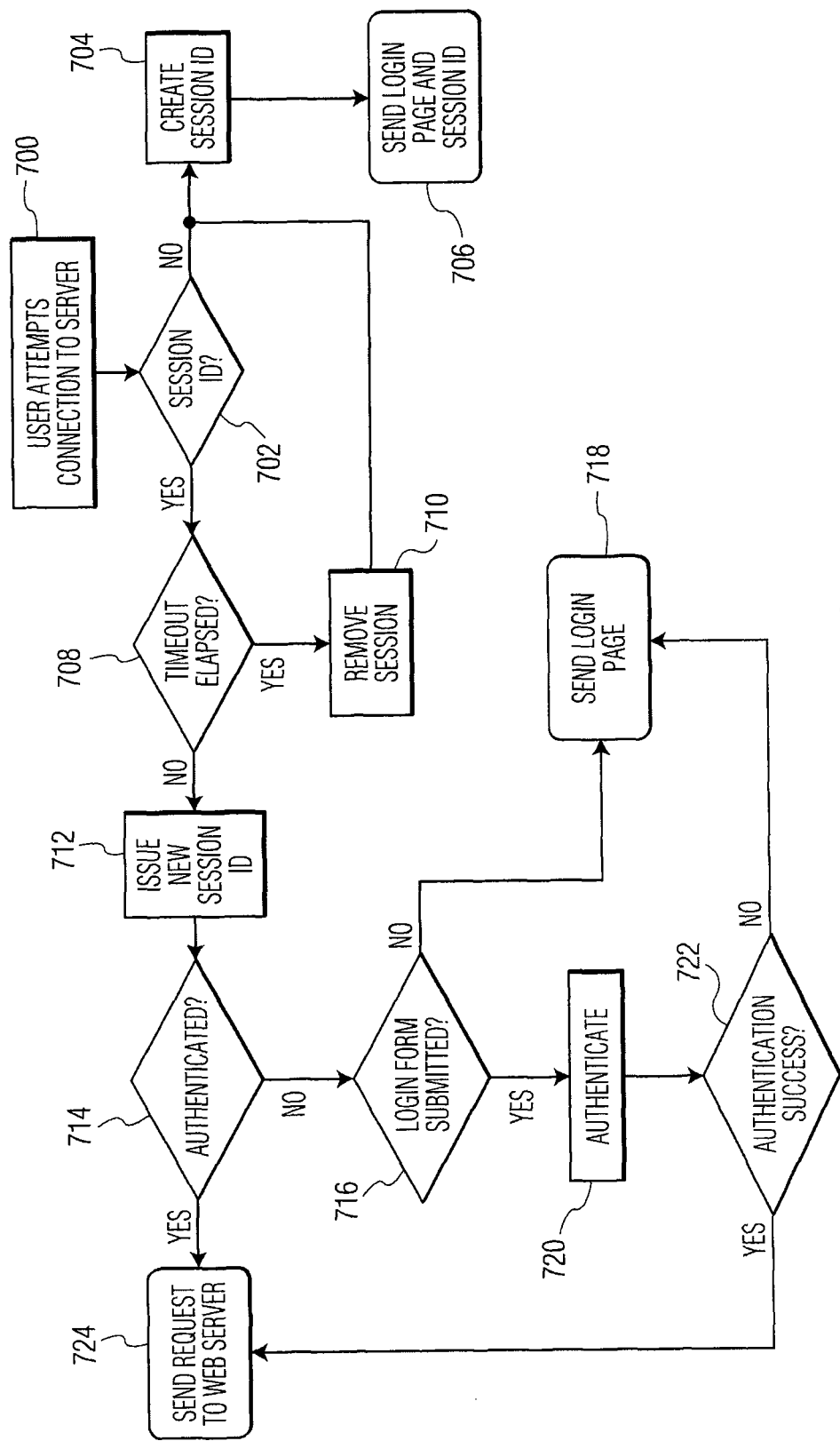
FIG. 7 is a flow diagram illustrating a computer system security process in accordance with an exemplary embodiment of the invention.

FIG. 7 is a flow chart illustrating an exemplary embodiment of the system security process. The process begins at step 700 when a user attempts to connect to the some resource (e.g., on a server) protected by the security system. At step 702 the security system determines whether the user has already been assigned a session ID. If the session (and a corresponding session ID) does not exist, the security system creates a session ID at step 704, and sends a login page along with the session ID to the user at step 706. At this point the user could then again attempt to connect to a resource that is protected by the security system, as at step 700.

If the user does have a valid session ID (e.g., a valid single use token), the security system determines whether the session ID has expired at step 708. The inactivity period (timeout period) may be set to any predetermined duration (or a variable duration), for example, the session ID may expire if there is more than 15 minutes between interactions. If the session ID has expired, the security system will remove the session at step 710, and then return to step 704 to create a new session.

If the session ID has not elapsed based on inactivity between the user and the computer system, the security system will issue a new session ID at step 712, and then determine if the user has been authenticated at step 714. If the user has been authenticated, a request is sent to the web server at step 724. After step 724, the user will receive a response from the web server (enabling access to the desired resource, such as an application), and the user's client (e.g., web browser) will be updated with the new session ID.

If it is determined that the user has not been authenticated at step 714, the security system determines if the user has submitted the appropriate login form for authentication at step 716. If the appropriate login form has not been submitted, the security system sends the appropriate login page to the user at step 718. If the user did submit the appropriate login page, the user is authenticated at step 720. If the authentication of the user is successful at step 722, the request is sent to the web server at step 724, and the results are returned to the user with the new session ID. If the authentication fails at step 722, the user is sent the login page along with the new Session ID at step 718.

As with the previously described embodiments, the web server that receives the requests after authentication of the client is verified could be any type of server, such as a network server. Again, the user's client could be any type of client, for example, a web browser, or a client that is designed to maintain the session ID on the user's machine. In an embodiment where the security system sends requests or packets to a server other than a web server, the format of the information being sent to this other server could be changed. The remaining aspects of the security system in these alternative exemplary embodiments would function as described by reference to FIG. 7.

Through the various exemplary embodiments disclosed herein, the security system may be used as a stand-alone security system. Alternatively, the security system may complement existing VPNs, firewalls, and proxy servers.

Figure 8:
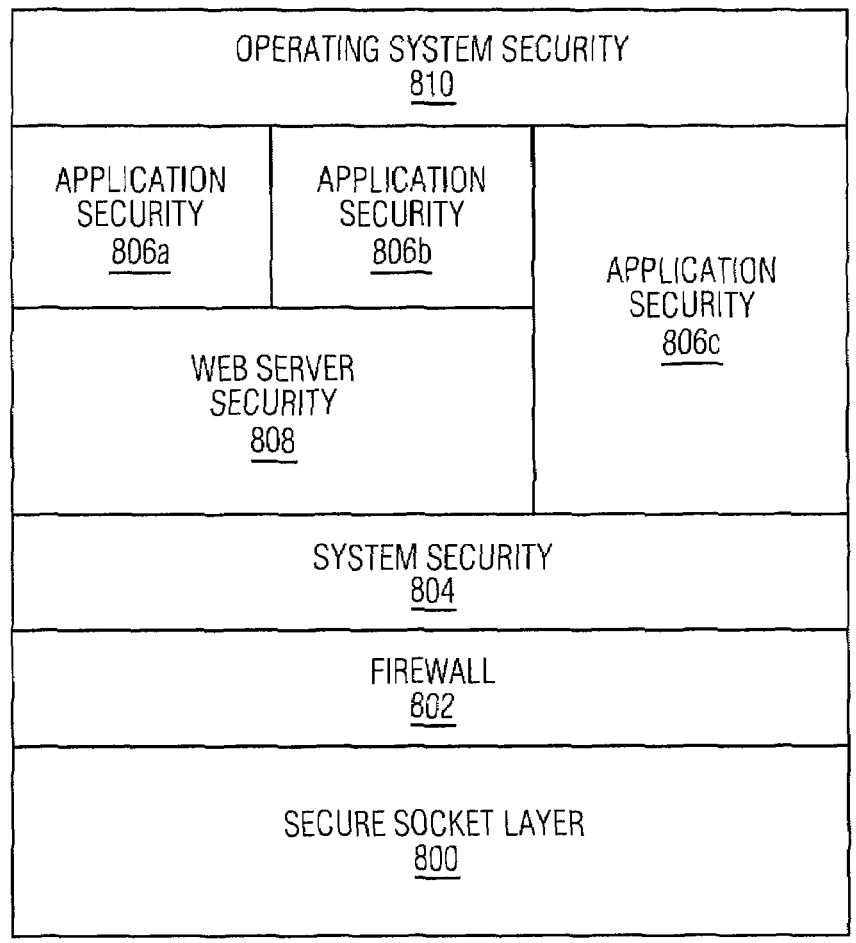
FIG. 8 is a block diagram illustrating a layered security model in accordance with an exemplary embodiment of the invention.

For example, FIG. 8 is a block diagram of a layered security model that includes the security system. The exemplary layered structure illustrated in FIG. 8 provides an overview of the process flow of requests for a resource such as a application from a user through numerous security layers. The requests are first decrypted at secure socket layer 800 (i.e., the request, for example, from a client browser, is carried through an SSL connection). The requests then proceed through firewall layer 802 (i.e., a physical device which limits access to the internal network). Firewall layer 802 filters out requests that are not allowed to be received by the network.

Once through firewall layer 802, the requests are evaluated by security system layer 804, as defined by at least one of the exemplary embodiments described herein. Security system layer 804 determines if a request can be allowed to continue past this layer of the security model based on the criteria described herein. As such, security system layer 804 authenticates all incoming and outgoing communications. If security system layer 804 permits a user's request for access to a resource (e.g., an application) to pass through the security system, the request is received by at least one of application security layers 806*a*, 806*b*, and 806*c* (i.e., security enforced within an application). Application security layer 806 corresponds to the application related to the request made by the user. For example, if the user requests access to a given application, or a resource included in a given application, the application may include an independent security level 806. Application security layers 806*a*, 806*b*, and 806*c* illustrate that the user may request access to one of a number of applications.

If the application is a web based application, a further security layer may be enforced by the web server at web server security layer 808 (i.e., security enforced by a web server). Finally, the operating system may enforce its own security, as the web server or application attempts to perform operations within the operating system, at operating system security layer 810 (i.e., security enforced by an operating system). For example, operating system security layer 810 determines which files on the server may or may not be accessed by a particular user.

Although the security system (i.e., system security layer 804) is illustrated in FIG. 8 as part of a multi-layer security model, such a configuration is not required. System security layer 804 may be used as a stand alone security layer, or may be used in combination with any other security system. As such, in the embodiment illustrated in FIG. 8, system security layer 804 may be used with any combination of the additional security layers illustrated.

The security system (and the methods of providing and restricting access to resources) disclosed herein have diverse applicability in a range of markets including financial services, horizontal wireless LAN (e.g., wireless sales-force automation and contractor services), and government regulated markets such as banking, healthcare, and HIPPA. However, these are merely exemplary applications: embodiments of the invention are not limited thereto.

Although embodiments of the invention have been described with reference to a user having a web browser client, it is not limited thereto. All potential users, with varying access capabilities, fall under the umbrella of the invention. As such, access control is substantially the same for both internal users (i.e., fixed line users as in a LAN), and external users (e.g., remote or wireless users). As described above, this is accomplished by suspending the state of transaction so that the firewall port is closed using a dynamic session ID (i.e., the revolving door).

Although various embodiments of the invention have been largely described in terms of a user attempting to connect to an application on an application server, it is not limited thereto.

Figure 9:
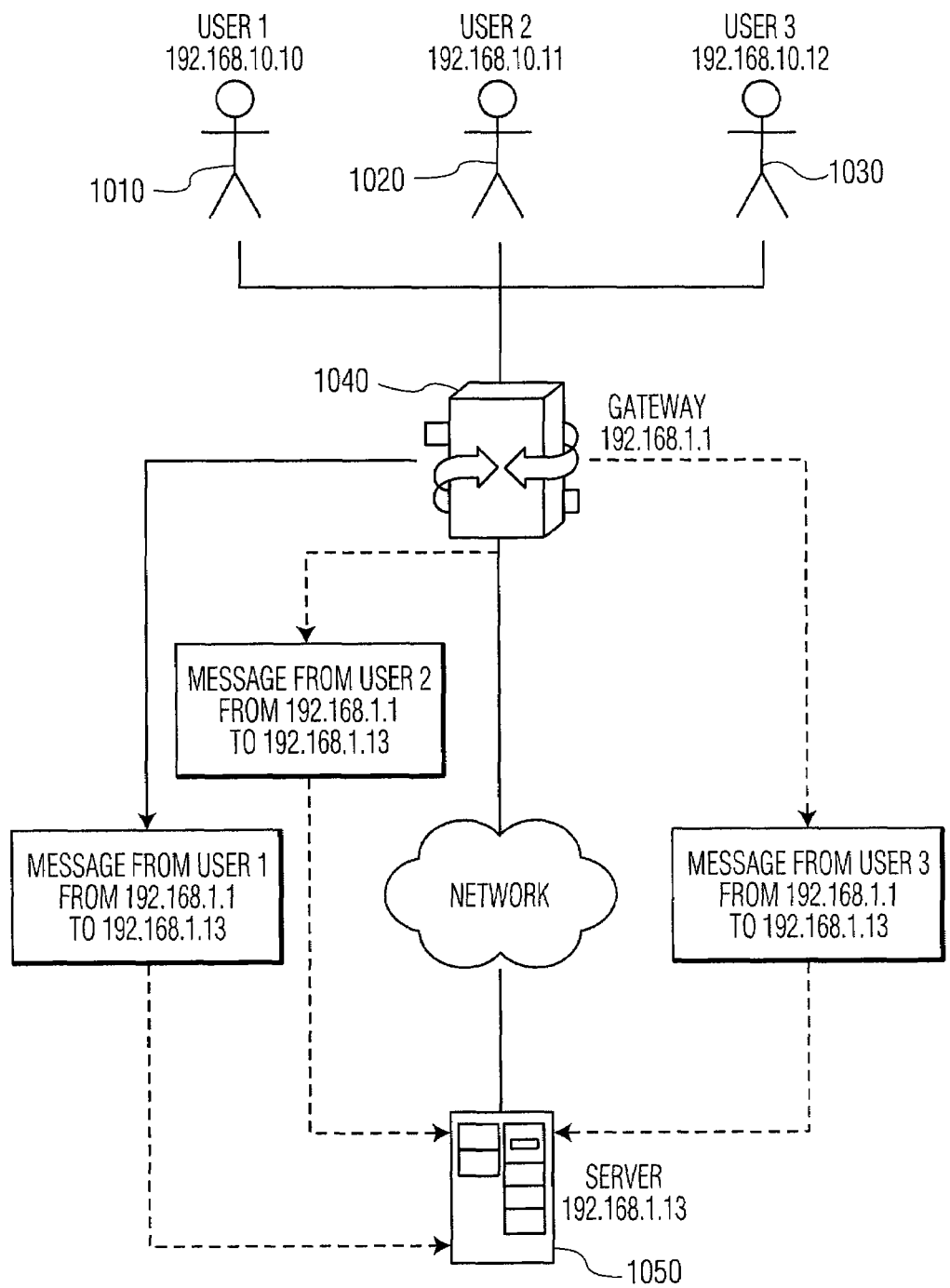
FIG. 9 is a block diagram illustrating communications from three users to a server system through a common network gateway.

FIG. 9 is a block diagram illustration of several users (i.e., User 1, User 2, and User 3 with network addresses 192.168.10.10, 192.168.10.11 and 192.168.10.12, respectively) communicating with a network through a common gateway 1040 (i.e., 192.168.1.1). Because the gateway 1040 overwrites the network addresses 192.168.10.10, 192.168.10.11 and 192.168.10.12 of the users 10, 20 and 30, respectively, with its own network address 192.168.1.1, the server 1050 (i.e., having a network address 192.168.1.13) sees every user 1010, 1020 and 1030 coming through the gateway 1040 as having the same network address (i.e., 192.168.1.1).

In configurations where it is not possible or practical to place a session identifier in the client-server application, it would be desirable to provide a method of identifying an originator of a computer transaction that overcomes at least one of the above-described deficiencies.

Generally, an exemplary embodiment of the invention relates to a security system that enables one, some or all users to be identified by a unique session identifier regardless of the application being used or the apparent network addresses of the users (i.e., a network address that may be overwritten by a network device such as a network gateway). Thus, user communications that go through a common network gateway that masks their true network addresses can be distinguished through their unique session identifier. A session identifier may be assigned to a user/client when beginning a server session. It may allow the user/client to be uniquely identified among all current users/clients of a server. It may use a client IP address to generate the session identifier. Moreover, session identifiers may expire, for example, due to termination of the corresponding session.

In certain exemplary embodiments of the present invention, a method of modifying networking protocols is provided that is computationally simple, is compatible with and expands upon existing network protocols, and is compatible with various encryption techniques. For example, the method optionally includes identifying a user and creating a corresponding session identifier. The session identifier may be changed with each communication, may be changed at a predetermined interval, or may remain constant for the user.

If the communication/message is sent from a client to a server, the message may be modified on the client side (i.e., at the client or on the side of the network gateway of the client) to add a session identification flag and a session identifier at the end of the message. A control portion of the message may also be re-computed on the client side to take into account the inclusion of the session identification flag and the session identifier at the end of the message.

After transmission to the server, the message is checked on the server side (i.e., at the server or on the side of the network gateway of the server) for the session identification flag. If the session identification flag exists, the session identifier is read on the server side. If the session identification flag exists, the session identification flag and the session identifier are removed on the server side. The control portion of the message may then be re-computed to take into account the removal of the session identification flag and the session identifier.

Of course, the process may be applied to messages from the server side to the client side. Further still, certain actions described with respect to one side (i.e., the client side or the server side) may be accomplished on the alternative side if desired.

In another embodiment, a client-server algorithm is provided in a computer readable medium that includes computer program instructions that cause servers and clients to implement the above-described method.

Through the various exemplary embodiments disclosed herein, a security system for securing information is provided. Additionally, methods of providing access to information, and restricting access to information, using the security system, are also disclosed. The disclosed invention is suited to the security of remotely accessed network environments through a network connection though other applications are contemplated as well.

According to certain exemplary embodiments of the present invention, a message may be sent to the security system from an external source (e.g., a user). A determination may be made as to whether the message contains an embedded session identifier. If the message does contain an embedded session identifier, the identifier may be used to determine how to process the message. The session identifier is stripped from the message and the message is repackaged into its original unmodified form and passed on appropriately. If the message does not contain an embedded session identifier, it can be rejected or processed according to the rules in place for messages without embedded session identifiers.

According to certain exemplary embodiments of the present invention used as part of a security system, the embedded session identifier allows one to reliably control the visibility of network resources to remote users of that network regardless of the applications being used. For example, the network may be configured to determine a user identity from the embedded session identifier instead of the user's network address. Because of the extensive use of network address translations and network gateways, network addresses can be arbitrary. However, the security system according to certain exemplary embodiments, may act as an umbrella over the remotely accessed network (i.e., may act to exclude unauthorized users) and may allow users to be identified by a unique session identifier rather than their apparent network address.

According to an exemplary embodiment of the present invention, all connectivity to the protected network must pass through the security system though it is also contemplated that at least selected connectivity to the protected network may not pass through the security system. Once a user has been authenticated, a session identifier may be created and embedded in all messages sent to and from the user according to an exemplary embodiment of the invention. The security system then checks all incoming messages for embedded session identifiers. If the message contains an embedded session identifier, it is read. If the session identifier is valid, the message is repackaged into its original unmodified form and processed according to the rules for the user associated with that session identifier. If the session identifier is not valid, the message is dropped. If the message does not contain an embedded session identifier the message can be processed in one of two ways: it can be dropped or it can be processed according to the rules for messages without embedded session identifiers.

In certain exemplary embodiments, all communication between the user and the network is encrypted so as to hide the communications from other authenticated and non-authenticated users (including users connected via the Internet). As such, session identification modification is either done after the encryption or before the encryption. If the modification is done after the encryption, the session identification is read and the message is repackaged before it is decrypted. If the modification is done before the encryption, the message is decrypted before the session identification is read and the message is repackaged. That is, an encrypting unit may be disposed on one side of the network gateway to encrypt the message to be transmitted and a decrypting unit may be disposed on the other side of the network gateway to decrypt the transmitted message. An encrypting unit and/or a decrypting unit may be included, for example, in the client and server system or on the client and server sides of the network.

A timeout feature may also be provided whereby the expiration of a predetermined period of inactivity is used to determine when the session (and the session ID) should be terminated. During the user's session, the inactivity/timeout period is continually updated. The timeout period is set by resources in the network and if the user does not perform an action/interaction within the predetermined timeout period, the session is terminated by deleting it from those same resources in the network. This allows a high level of security because meaningful information is not stored on the user's computer. Further, even if someone does gain access to the user's computer, after the timeout period has expired, any information that might be stored in a file (e.g., cookie) on the user's computer is no longer valid.

In certain embodiments of the present invention, after the user has logged in, a number of checks may take place each time the user moves within the system in order to determine what resources the user can access. For example, the security system may determine the identity of the user accessing the system. The session may be validated by checking the user ID against a database of user IDs on the network. If a session ID is invalid, the session is invalid, and the user is forced to log in before accessing the system. If the session ID is valid, the system retrieves the associated user ID and continues to perform whatever actions are necessary to finish displaying the approved information.

Through various exemplary embodiments, the process of accessing a resource (e.g., an application) on a remote server begins with the user logging into the security system (e.g., logging in using a single sign on software that logs the user directly into the security system). Once logged in, a session identifier is created and embedded in all communications between the user and the network. The user can run client applications that connect to applications hosted on the application server and view objects if the client applications have been pre-configured with the addresses of the application servers. If the client applications have not been pre-configured with the addresses of the application server, the user can be provided with a unique token that provides a single use link to the application server. The token either contains the information required to connect to the application server or retrieves the information required to connect to the application server. The client application then connects to the application server, and the application server then displays all objects and applications approved for the user.

The figures described herein illustrate a modification to a network protocol and may utilize common programming languages. This security system contemplates the desire to provide secure access to all remote applications, software, and content. The security system also contemplates and provides embodiments that involve installation of the services on the remote user's device.

The security system of the present invention may be implemented in a number of mediums. For example, the system can be installed on an existing computer system/server as software. Further, the system can operate on a stand alone computer system (e.g., a security server) that is installed between another computer system (e.g., an application server) and an access point to another computer system. Further still, the system may operate from a computer readable carrier (e.g., solid state memory, optical disk, magnetic disk, radio frequency carrier wave, audio frequency carrier wave, etc.) that includes computer instructions (e.g., computer program instructions) related to the security system.

Figure 10:
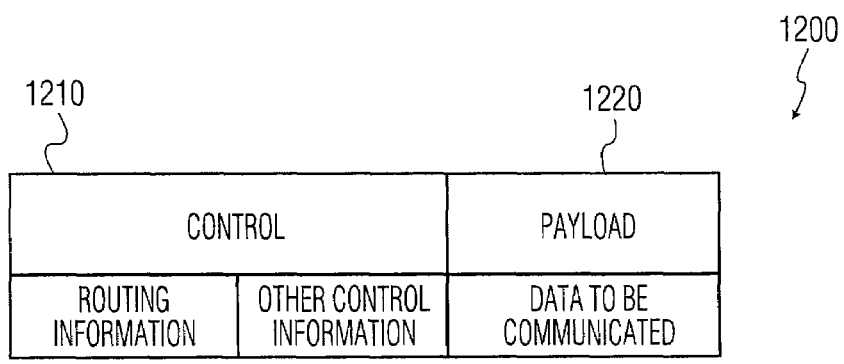
FIG. 10 is a illustration of the contents of a message in a typical computer networking protocol.

The present invention, according to the exemplary embodiments selected for illustration in the figures, relates to the modification of existing network protocols to embed a session identifier into the messages sent back and forth between a client and a server. FIG. 10 is an illustration of a typical message 1200 that is sent over computer networks. The message 1200 consists of a control portion 1210 and a payload portion 1220. The control portion 1210 contains information that allows the message 1200 to be routed to and received by the proper network location (e.g., routing information and other control information such as hardware address data). The payload portion 1220 contains the actual data to be communicated.

The network protocol modification consists of a client portion and a server portion. If the message is sent by a client to a server, the client portion may be modified in three steps. The first step is to add a flag to the message (such as at the end of the message) that indicates that the message contains an embedded session identifier. The second step is to add the session identifier to the message (such as after the flag). Finally, the third step is to re-compute the control portion of the message to take into account the data added to the message in the first and second steps. The message which includes the modified network protocol may be communicated over a computer system (e.g., a network), such as the one depicted in FIG. 9. That is, the computer system (see FIG. 9) may include a server and a client operationally connected to the server to transmit one or more messages therebetween. Each of the messages to be transmitted may be modified by one of the client or the server to include a session identification flag (e.g., a security identifier, a client ID that indicates the client devices identifier and/or tag) and a session identifier, and the modified message may be transmitted to the remaining one of the client and the server such that the session identification flag of the transmitted message is checked by the remaining one of the client and the server to validate the session identifier. Moreover, if the session identifier is validated, the session identifier of the transmitted message may be read to determine the originator of the transmitted message.

The computer system may further include a network gateway disposed operationally between the client and server and providing access to the server, and the server may be remotely accessible by the client. Further, the network gateway may include a database to validate the session identifier by checking a user identifier. If the session identifier is not valid, the computer system may force the user to log in prior to accessing the server and, otherwise, if the session identifier is valid, the computer system may retrieve an associated user identifier and the server may process the transmitted message.

Figure 11:
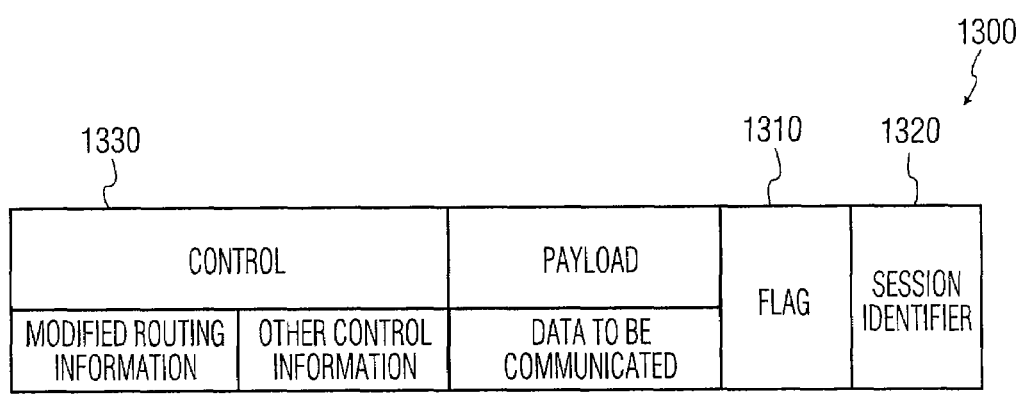
FIG. 11 is an illustration of the message depicted in FIG. 10 modified in accordance with an exemplary embodiment of the invention.

FIG. 11 is an illustration of the message 1300 depicted in FIG. 10 after network protocol modification. A flag 1310 has been added after the end of the original message. A session identifier 1320 has been added after the flag, 1310 and the control portion 1330 of the message 1300 has been altered to take into account the added flag 1310 and session identifier 1320. For example, the control portion 1330 may include data related to the length of the data portion, or data related to a CheckSum calculation. By increasing the length of the data portion (through the inclusion of the session identifier and the flag) these values in the control portion 1330 are affected, and as such, are re-computed.

Figure 12:
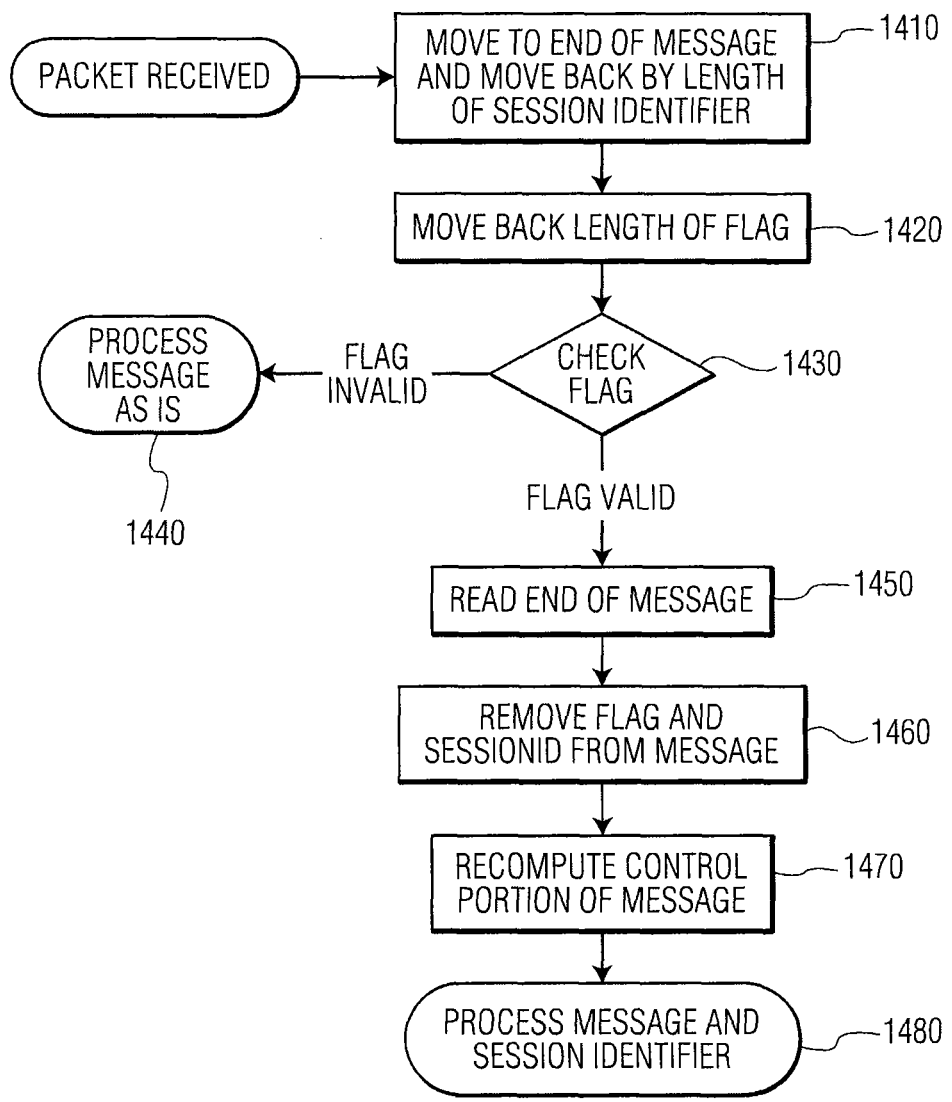
FIG. 12 is a flow diagram illustrating a method through which a server reads messages in accordance with another exemplary embodiment of the invention.

FIG. 12 is an illustration of a flow diagram illustrating an exemplary method through which a server reads messages. The server desirably analyzes every message received. After a communication packet is received by the server, it is determined whether a flag is added that indicates that the message contains an embedded identifier, by starting at the end of the message and moving back by the length of the session identifier at step 1410. For example, this length may be agreed upon (e.g., predetermined), and as such, the server desirably knows this length. After step 1410, the data is read by moving back by the length of the flag at step 2. After step 1420, it is determined if the data matches the session identification flag at step 1430. If the flag does not match, the message has not been modified by the protocol and one proceeds to step 1440. At step 1440, the message is processed as is. If the flag does match the session identification flag, the message has been modified by the protocol and one proceeds to step 1450. At step 1450, the end of the message (i.e., the session identifier) is read. After step 1450 the flag and the session identifier are removed from the end of the message at step 1460. After step 1460, the control portion of the message is recomputed to take into account that the flag and session identifier have been removed from the end of the message at step 1480. After step 1470 the resulting message is processed along with the session identifier at step 1480.

Figure 13:
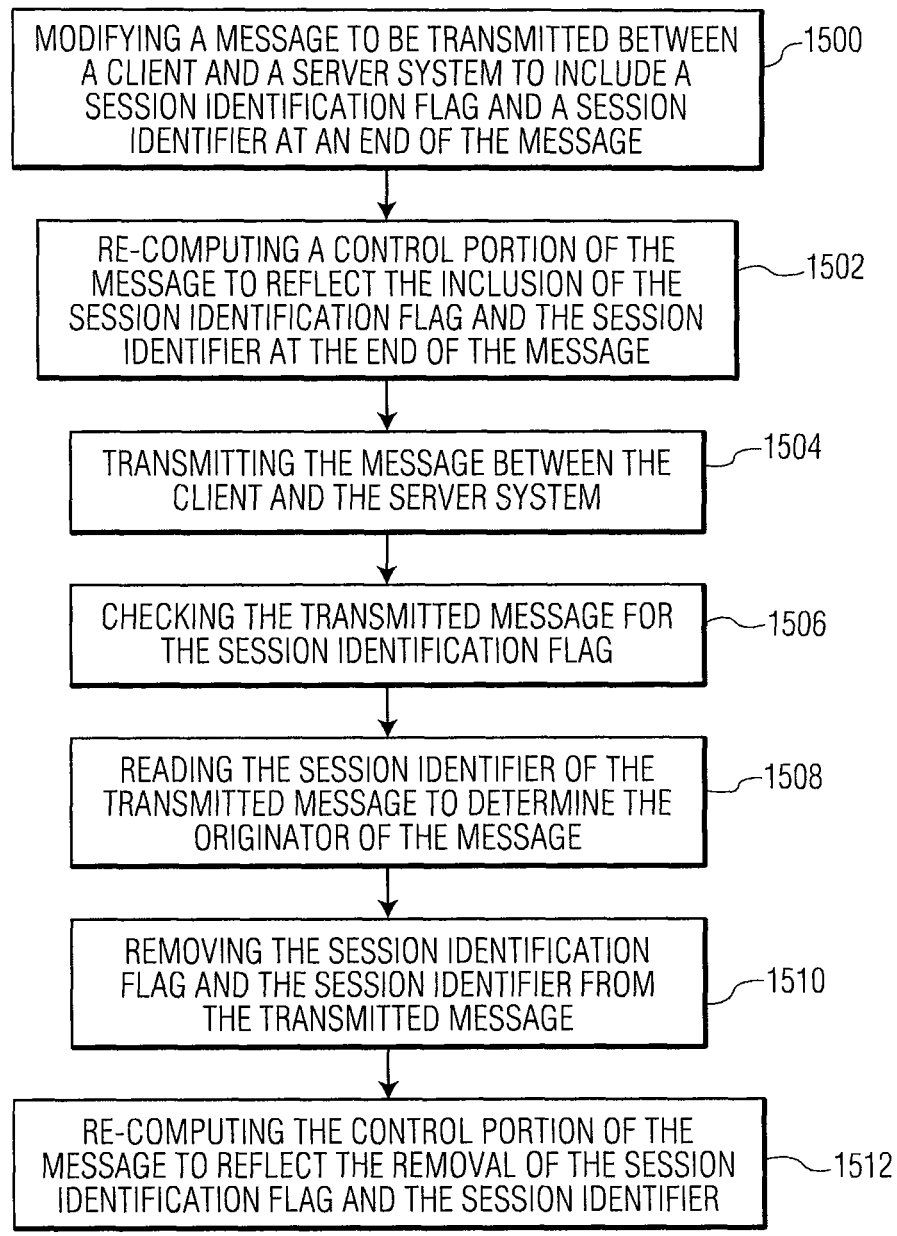
FIG. 13 is a flow diagram illustrating a method of identifying an originator of a message transmitted between a client/server system in accordance with yet another exemplary embodiment of the invention.

FIG. 13 is a flow diagram illustrating a method of identifying the originator of a message transmitted between a client and a server system in accordance with an exemplary embodiment of the present invention. At step 1500, a message to be transmitted between a client and a server system is modified to include an indicator (e.g., a client ID and/or a session identification flag) and a session identifier at an end of the message. At step 1502, a control portion of the message is re-computed to reflect the inclusion of the indicator and the session identifier at the end of the message. At step 1504, the message is transmitted between the client and the server system. At step 1506, the transmitted message is checked for the indicator. That is, the indicator from the transmitted message is compared with an established value to validate the session identifier. At step 1508, the session identifier of the transmitted message is read to determine the originator of the message. At step 1510, the indicator and the session identifier is removed from the transmitted message. At step 1512, the control portion of the message is re-computed to reflect the removal of the indicator and the session identifier.

In certain situations, there is a chance that the data in an unmodified message will match the indicator. If the data in a message is random, this chance is determined by the length of the indicator. If the indicator is 8 bits long, then the chance for a random match is 1 in $2^8$ or 1 in 256. In such a case, one can calculate the chance that the erroneous session identifier will match that of an actual session identifier in use. If the session identifier is the length of an unsigned long integer, then on the typical system, this will have a length of 8 bytes. This results in about $1.8 \times 10^{19}$ possible session identifiers. If such a system had as many as 10,000 active sessions, the chance that the erroneous session identifier would match that of an active session would only be 1 in $1.8 \times 10^{14}$. Thus, the chance of a message being processed erroneously would only be about 1 in $4.0 \times 10^{16}$. However, the chance that extra work is done to extract the session identifier erroneously is 1 in 256.

Thus, an efficient way to reduce the chance of erroneously processing a message and decreasing the amount of work done is to increase the length of the session identification flag. If the length of the session identification flag were that of an integer (on most systems this would be 4 bytes or 32 bits long), the chance for a random match would be 1 in $2^{32}$ or about 1 in 4 billion.

Figure 14:
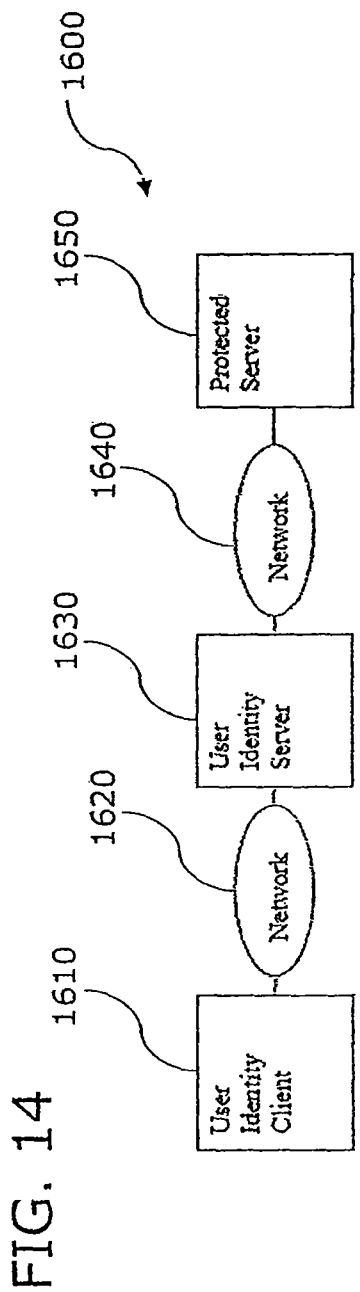
FIG. 14 is a block diagram illustrating a client/server system in accordance with yet another exemplary embodiment of the invention.

FIG. 14 is a block diagram illustrating a client/server system 1600 in accordance with yet another exemplary embodiment of the invention.

Referring to FIG. 14, client/server system 1600 includes a user identity client (UID client) 1610, a first network 1620, a user identity server (UID server) 1630, a second network 1640 and a protected server 1650. UID server 1630 is provided in-line between first network 1620 which may be an unprotected (open) network and second network 1640 which is a protected network. UID server 1630, in this configuration is a physical device which may act to filter network traffic between first network 1620 and second network 1640. UID server 1630 may authenticate security tags embedded, for example, in each packet of a communication between UID client 1610 and UID server 1630. That is, UID server 1630 may verify the authenticity of the UID datagrams and determine whether to forward or drop UID datagrams according to pre-defined accessing rules.

In certain exemplary embodiments, a list of pre-registered (predetermined) applications may be exchanged between UID server 1630 and UID client 1610. Each member of the list may include the following information: (1) a name of the application, (2) a version of the application, (3) a signature which is hashed value used to identify the executable of the application, and (4) an application ID (which may be unique ID) and is a numerical representation of the application.

When adding the security tag to a packet/datagram, UID client 1610 may detect the application that sources (originates) the packet/datagram. UID client 1610 may add the application ID into the application ID field of the security tag 2000 (see FIG. 17). UID server 1630 may determine whether to forward or drop the packet/datagram based on, for example, information from the UID client inserted into the application ID field or this information along with additional information from UID client from other fields of security tag 2000 and of the datagram by comparing the information against its access rule list when receiving the datagram is received by UID server 1630. UID server may generate log messages based on the result of the determination to either forward or drop the packet/datagram.

In various exemplary embodiments, UID client 1610 may obtain, for example, a user ID from UID server 1630. UID client 1610 may add the user ID into datagrams destined for protected network 1640 connected physically through UID server 1630 or logically through UID server 1630. The user ID embedded in each datagram offers a verifiable signature of the logged in user on UID client 1610 at a particular time (instance).

UID Server 1630 may be configured with access control lists that may include a global access list, a user access list, and an exception list. Each UID client expected to access protected network 1640 may be sent a resource list that tells the UID client which packets must be tagged. The UID client adds security tags only to packets going to restricted resources. UID server 1630 may verify the user ID to identify the user. UID Server 1630 may use the user ID in additional to other networking information from the package/datagram including, for example, the source address (e.g., source IP address), source port, destination IP address (e.g., destination IP address), destination port, and protocol) to determine whether or not to forward the datagram to protected network 1640. UID server may remove the user ID from the datagram when the datagram is forwarded to (leaves) UID network 1610, 1630. If UID server cannot verify the user ID embedded in the datagram or if the user ID has not been embedded in the datagram, UID server 1630 may determine to forward or drop the datagram as if the datagram does not belong to any user (based on pre-defined access policies). The user ID allows user information to be sent on each TCP/IP datagram between UID client and server 1610 and 1630. The security tag 2000 provides additional information about the user and UID client 1610 to UID server 1620. By comparing the additional information/fields to the access control lists, UID server 1630 may make decisions about filtering of UID datagrams based on increased information. For example, the availability of the application ID information allows UID server 1630 to decide to forward or to drop a datagram based on an application detected by UID client 1610.

Although UID server 1630 is shown as in-line between first network 1620 and second network 1640, it is contemplated that other configurations are also possible. For example, UID server 1630 may be a component of protected server 1650. UID server 1630 may function in software or may be a physical component of protected server 1650. In such a configuration, UID server 1630 may filter network traffic from UID client 1610 before the network traffic reaches other functions/components of protected server 1650.

Although the UID client 1610 is shown as a separate device, UID client 1610 may be implemented in software or hardware. Further, UID client 1610 may be implemented as a component on a client machine or any other separate physical device. UID server 1630 and UID client 1610 may be implemented in, for example, a device situated at a termination or gateway of first network 1620 or second network 1640. UID server 1630 may track the authenticated states of each UID client 1610 from either a network access point (physical access point) or via a logical access point (by routing communication through a server on protected network 1640 or via a software agent in protected network 1640.

Although one UID client is shown, it is contemplated that any number of UID clients may access protected network/server 1640 and 1650.

Figure 15A:
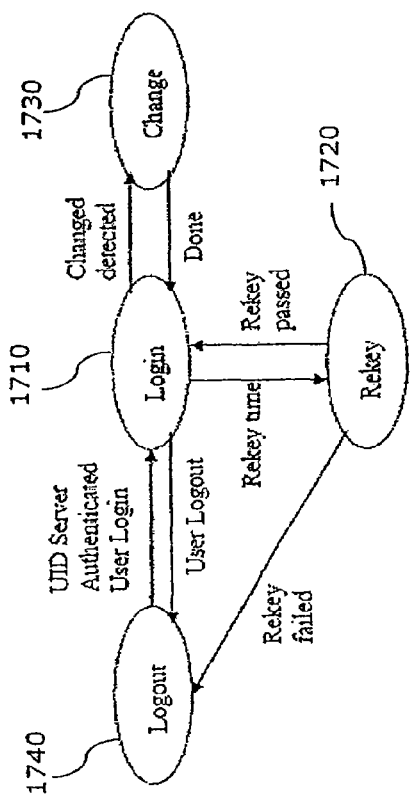
FIG. 15A is a state diagram illustrating operational states of a client device in accordance with yet another exemplary embodiment of the invention.
Figure 15B:
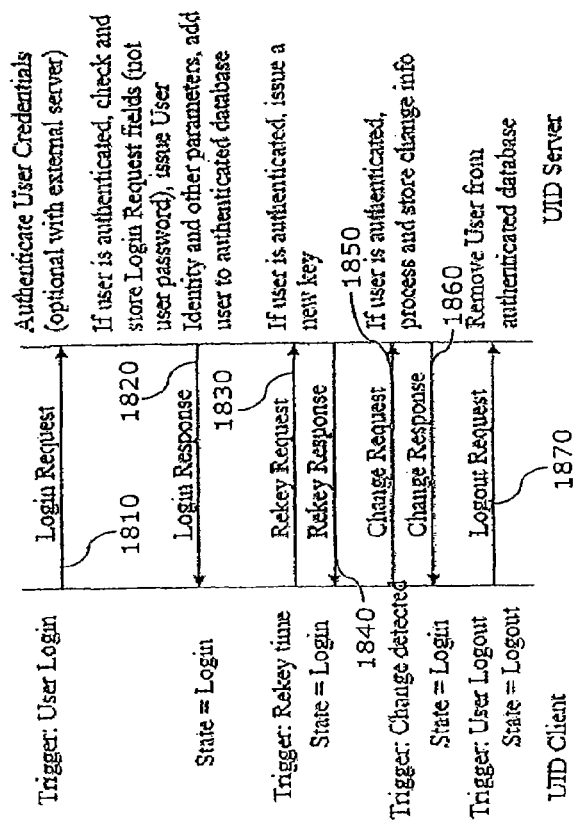
FIG. 15B is a schematic diagram illustrating messaging of UID client and UID server devices for the operational states shown in FIG. 15A.

FIG. 15A is a state diagram illustrating operational states of client device 1610 in accordance with yet another exemplary embodiment of the invention. FIG. 15B is a schematic diagram illustrating messaging of UID client and UID server devices 1610 and 1630 for the operational states shown in FIG. 15A.

Now referring to FIGS. 15A and 15B, when a user signs on to UID client 1610, UID client 1610 may establish an obscured and temporal communication channel with UID server 1630. One of skill in the art understands that known communication techniques exists for establishing such an obscured and temporal communication channel, for example, using a Secured Session Layer (SSL). UID client 1610 may initiate this channel at one of the following operational states: (1) a login state, (2) a re-key state, (3) a change state or (4) a logout state. Once messages are exchanged, either UID client 1610 or UID server 1630 may terminate the communication channel.

User sessions may start from the login state and may end at the logout state. Re-key and change states may be optional.

Starting from the logout state, a user may send a login request 1810 from UID client 1610 to UID server 1630. Login request 1810 includes a login request message and requests UID server 1630 to permit the new user to access protected network 1640 and/or protected server 1650.

Network traffic from the new user may be subject to an access control policy list stored on UID server 1630. The access control policy list may be stored in any number of formats such as a database, an indexable list or a text file. The access control policy list may be used to control filtering of network traffic of a user that does not have permission to communicate with protected network 1640 and/or protected server 1650. That is, the access control policy list enables filtering of packets (datagrams) from UID client 1610 by UID server 1630. UID server 1630 may authenticate the user's credentials (e.g., the user's password, biometric information, and/or client ID) and may authorize access to protected network 1640 and/or protected server (resource) 1650.

FIG. 15C is a schema illustrating an exemplary login request of FIG. 15B message.

Referring to FIGS. 15A-15C, login request 1810 may include a login request message with, for example, (1) a message version 1810*a* for indicating the version of the login request, (2) a client version 1810*b* that indicates the UID client software version, (3) a client ID 1810*c* that indicates the cached user identification stored on UID client 1610, (4) a client operating system 1810*d* that indicates the type of operating system and version number of the operating system, (5) a login name 1810*e* that indicates the user's name (user login name), (6) a user authentication password 1810*f*, (7) a user domain name 1810*g*, (8) a hardware ID 1810*h* that indicates a unique string for each client machine, (9) a client address 1810*i* that indicates an address of the client machine (e.g., Internet Protocol Version 4 or 6 address), (10) a maximum key size 1810 that indicates the number of octets corresponding to the key size, (11) a digital signature type indicator 1810*k* that indicates the digital signature algorithm (which may be, but not limited to, a hashing algorithm such MD-5, SHA-0, SHA-1, SHA-224, SHA-256, SHA-384, and SHA-512) used in the security tag for each packet (datagram), and (12) a context that indicates the state of a multi-factor authentication. This client information embedded in login request 1810 may be used by UID server 1630 for authentication. The context may be used for authentication when different types of authentication are used, such as passwords, smartcards, and biometrics, among others. The client information in login request 1810 is also used by UID server 1630 for authorization of the user/UID client 1610 to access protected network 1650. If the user/UID client 1610 is authenticated and authorized to access protected network 1650, UID server 1630 may return to UID client 1610 a login response 1820 (See FIG. 15B).

Figure 15D:
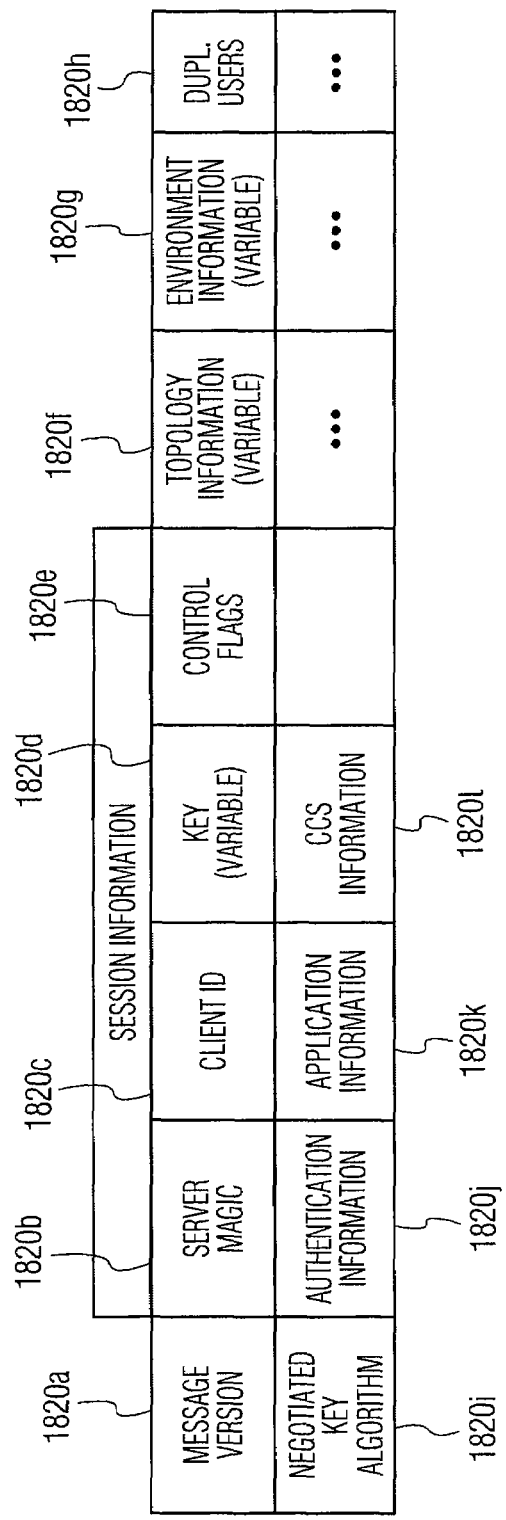
FIG. 15D is a schema illustrating an exemplary login response message of FIG. 15B.

FIG. 15D is a schema illustrating an exemplary login response message of FIG. 15B.

Referring to FIGS. 15A, 15B and 15D login response 1820 may include a login response message with: (1) a message version 1820*a* that indicates the version of the message, (2) a string 1820*b* that indicates the current gateway instance of UID server 1630, (3) the client ID 1820*c*, (4) a secret key 1820*d* to be used for generating the security tag embedded in each datagram/packet, (5) a key timeout indicator (not shown) that indicates the lifetime of the secret key after which it is no longer valid (typically 15-30 minutes, but other times are also possible), (6) an inactivity timeout indicator (not shown) that indicates the maximum timeout (period of inactivity) of UID client 1610 communicating with UID server 1630 before the current session is terminated, (7) a UID software server version (not shown), (8) control flags 1820*e* that indicate: (i) whether none, a part or the entire payload is used in the security tag calculation, (ii) whether the TCP sequence number is used in the security tag, (iii) the scale factor of the security tag (e.g., whether the length of the security tag is, for example, 32 or 64 bits), (9) session management information 1820*f*-1820*l* including topology information 1820*f* relating to the topology of protected network 1640, environmental information 1080*g*, duplicated users 1820*h*, the negotiated key-algorithm 1820*i* to be used in authenticating each security tag, and (10) authentication information 1820*j* such as the context, message, label, PIN options and minimum and maximum PIN lengths, application type information 1820*k* and CCS information 1820*l* that indicates a compliance code for accessing protected network 1640.

After the user sends the login request 1810 from UID client 1610, if the client information in the login request 1810 is authenticated and authorized to access a resource on protected network 1640, UID server 1630 returns to UID client 1610 login response 1820. UID server 1630 may validate (check) and store login request fields 1810a to 1810l.

In certain exemplary embodiments, the user password 1810f may not be stored in UID server 1630.

Figure 15E:
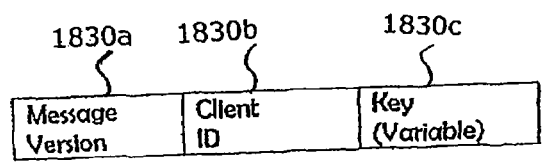
FIG. 15E is a schema illustrating an exemplary re-key request of FIG. 15B.

FIG. 15E is a schema illustrating an exemplary re-key request of FIG. 15B.

Referring now to FIGS. 15A, 15B and 15E upon reception by UID client 1610 from UID server 1630 of login response 1820, UID client 1610 enters the login state 1710. Login state 1710 for UID client 1610 may be effected by a re-key request 1830 to place the user/UID client 1610 in a re-key state 1720. For example, login response 1820 may include a key timeout indicator. That is, a time period before which UID client 1610 must establish a new key (by re-key request 1830). If a new key is not established before the expiration of the key timeout the user/UID client 1610 is moved to the logout state 1740 by UID server 1630. UID client 1610 may send re-key request 1830 to UID server 1630 any time before the key timeout expires.

In one exemplary embodiment, UID client 1610 sends re-key request 1830 to UID server 1630 at a random time before the key timeout expires. The random time for sending the re-key request 1830 may be between around 50% to around 75% of the key timeout indicator expiration period.

Re-key request 1830 may include a re-key request message with a message version 1830a, a client ID 1830b and the secret key 1830c used in generating the security tag.

Figure 15G:
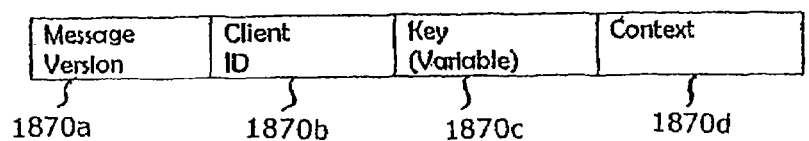
FIG. 15G is a schema illustrating an exemplary logout request of FIG. 15B.
Figure 15F:
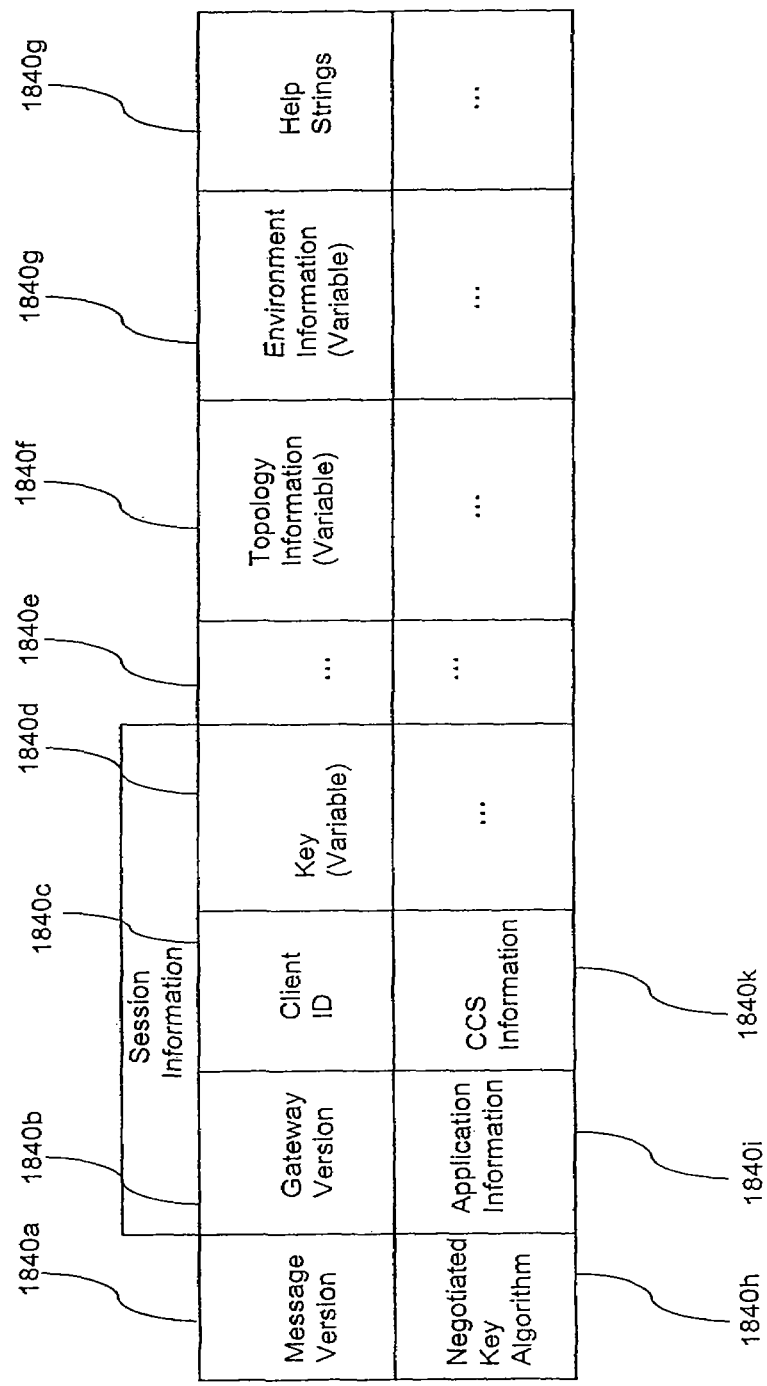
FIG. 15F is a schema illustrating an exemplary re-key response 1840 of FIG. 15B.

FIG. 15F is a schema illustrating an exemplary re-key response 1840 of FIG. 15B.

Referring to FIGS. 15A, 15B and 15F, UID server 1630 may issue a re-key response 1840 which includes a newly generated secret key 1840d, if the secret key 1830c in the re-key request 1830 matches the active secret key (e.g., the secret stored in UID server 1630 and/or UID server key database (not shown)). Re-key response 1840 is similar to login response 1820 with the exception that secret key 1840d is a changed secret key (e.g., the new secret key) such that subsequent datagrams sent via UID client 1610 include the changed secret key 1840d. That is, subsequent datagrams sent from UID client 1610 are checked for whether they include the changed secret key 1840d. If the secret key 1830c sent in re-key request 1830 does not match the active secret key stored in UID server 1630, the state of UID client 1610 is changed to logout state 1740 and UID client 1610 to gain subsequent access to protected network 1640 and/or protected server 1650 may need to re-authenticate and re-authorize to UID server 1630.

FIG. 15G is a schema illustrating an exemplary logout request of FIG. 15B.

Referring to FIGS. 15B and 15G, when UID client 1610 desires to logout of protected network 1640, UID client 1610 may send a logout request 1870 to terminate its authenticated status with UID server 1630. Such a request may remove the user from an authentication database (not shown) of protected network 1640. The authentication database may be included in UID server 1630 or may be provided in any device on protected network 1640. Logout request 1870 may include a logout message with a message version 1870a, client ID 1870b, the active secret key 1870c and context 1870d for multi-factor authentication such as for use in accommodation of biometric, smartcard and password authentication.

UID client 1610 may notify UID server 1630 of a changed condition or state 1730 using a login request 1810, as a change request 1850. UID server 1630 may acknowledge such a request, as a change response 1860. The change request 1840 may provide an update from UID client 1610 to UID server 1630 without user re-authentication.

A changed condition or state may include, for example, a change to: (1) the client's address (e.g., physical or logical address, such as the MAC or IP address), (2) the client's health state (e.g., anti-virus signature, patch level for the anti-virus application, and firewall configuration), (3) the network access compliance state including network user endpoint security compliance or (4) a next-hop address (for example, a change to a fixed device surrogate address for a mobile device).

In one exemplary embodiment, UID client 610 may be implemented as software in a client machine. In such a situation, UID client may be loaded onto each network machine. UID client 1610 may exchange messages to move between permissible operational states 1710, 1720, 1730 and 1740 (see FIG. 15A) and may add a security tag to each packet (datagram) sent via UID server 1630.

Figure 17:
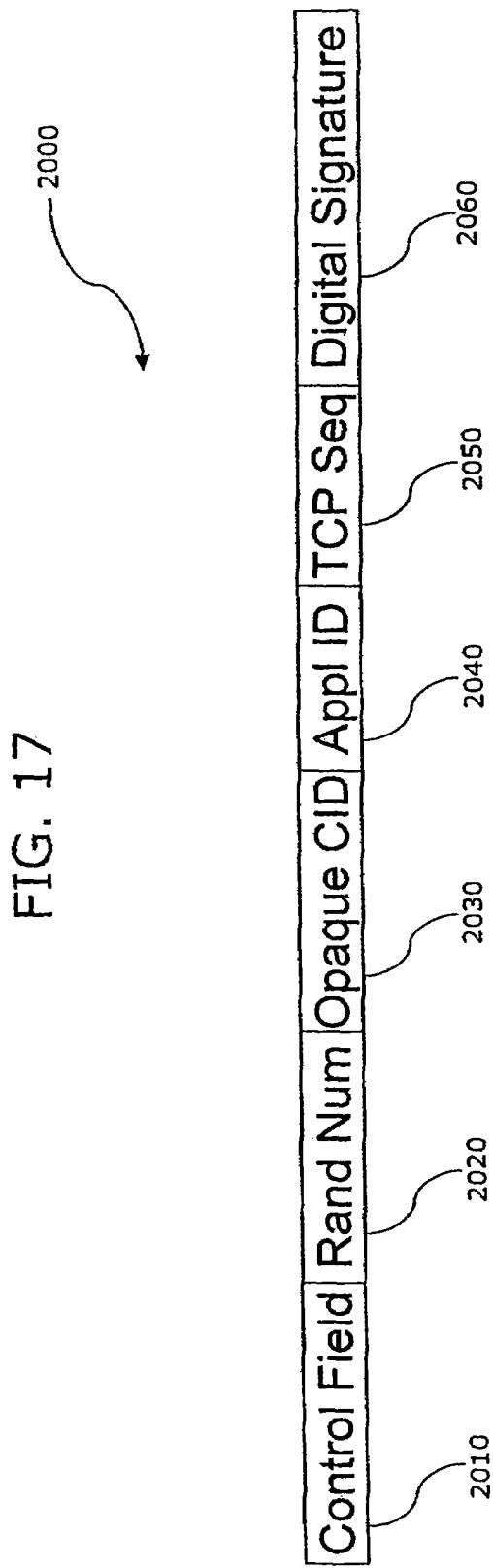
FIG. 17 illustrates a security tag 2000 in accordance with yet another exemplary embodiment of the invention.

After UID client 1610 is authenticated and is in the login state 1710, each packet/datagram (e.g., IP datagram or IP packet) sent by UID client 1610 includes security tag 2000 (see FIG. 17). By providing security tag 2000 in each datagram, UID server 1630 can verify the authentication of each datagram received to identify the user accessing protected server (resource) 1650.

After UID client 1610 enters logout state 1740, UID client 1610 may stop embedding (adding) security tags 2000 to the datagrams.

The UID Client 1610 may include a (1) user-interface, (2) a service module and a driver module. The user-interface is a component that allows a user to interact with the UID network (i.e., UID client/server 1610, 1630) for activities such as login, and logout. It also provides the user a current status of the users/UID client's authentication. The service module is a component that includes a state machine to control states of the UID client 1610. It is the initiator of the UID Client-UID Server 1610, 1630 obscured and temporal communication channel from which messages are exchanged. The driver module is a component that intercepts outgoing datagrams and adds security tags to the outgoing datagram.

The driver module may be placed in different positions relative to other drivers to properly add the security tags to datagrams. For example, if the UID Network 1610, 1630 is outside an IPSEC/VPN tunnel, the driver module is installed before the driver of the IPSEC/VPN tunnel. If, however, the UID network 1610, 1630 is inside the IPSEC/VPN tunnel, the driver module is installed after the driver of the IPSEC/VPN tunnel. Placement for driver modules of the UID server 1630 is similar to that of the driver module for UID client 1610.

Figure 16:
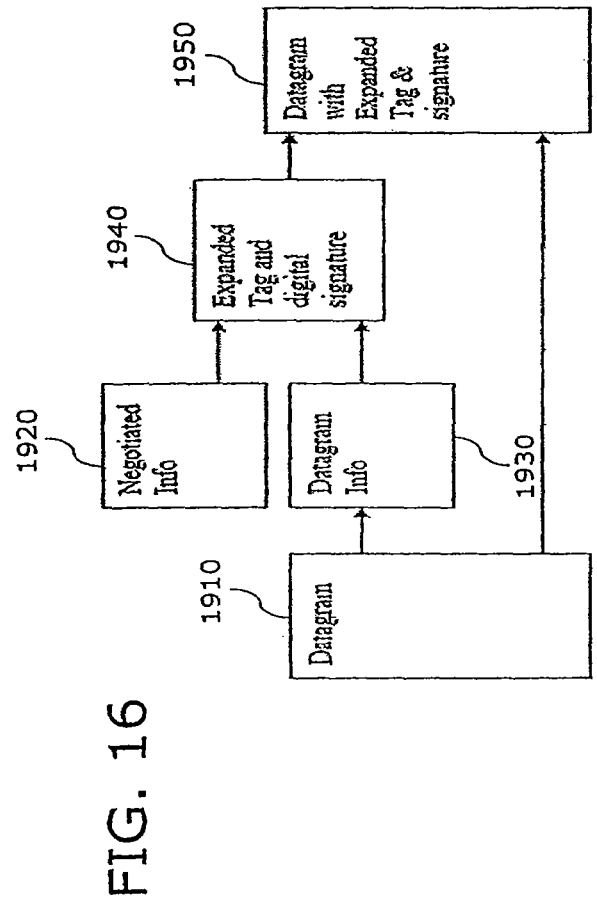
FIG. 16 is a flowchart illustrating a method of generating a packet (datagram) in accordance with yet another exemplary embodiment of the invention.

FIG. 16 is a flowchart illustrating a method of generating a packet (datagram) in accordance with yet another exemplary embodiment of the invention. As shown, UID client 1610 may generate datagrams with security tags 2000 by including in security tag 2000 information negotiated between UID client 1610 and UID server 1630 either during the login request/response 1810 and 1820 or subsequently during updates of the negotiated information during (i) re-key request/response 1830 and 1840 or (ii) change request/response 1850 and 1860 at block 1920. UID client 1610 may also include in security tag 2000, certain negotiated information 1920 and datagram information 1930 which may be combined and digitally signed at block 1940. Security tag 2000 with digital signature 2060 may then be appended at the end of the packet/datagram at block 1950.

Negotiated information 1920 used in security tag 2000 may include: (1) the client ID, (2) the gateway software instance, (3) the secret key, (4) a flag identifying the hash or security algorithm to generate security tag 2000, and (5) the application-type identifier. The datagram information 1930 used to form security tag 2000 may include, for example, (1) the IP version and other IP header fields, (2) TCP sequence number and other TCP header fields, and (3) the packet/datagram payload.

FIG. 17 illustrates a security tag 2000 in accordance with yet another exemplary embodiment of the invention.

Now referring to FIG. 17, security tag 2000 includes a control field 2010, a random number 2020, an opaque client ID (CID) 2030, an application-type ID 2040, a TCP sequence number 2050 and a digital signature 2060.

In certain exemplary embodiments, control field 2010 may include a release version indicating the version of security tag 2000 included in each datagram, a length indicator which indicates the length of security tag 2000, the key number, the length scale indicating the length of the secret key in bytes, a flag indicating whether the TCP sequence number is included in security tag 2000, another flag indicating whether the entire payload or a partial payload is included in security tag 2000 and the gateway software instance.

Random number 2020 of the same byte length as the client ID is exclusively ORed (XOR) with the client ID to produce an opaque CID 2030. Random number 2020 and opaque CID 2030 are embedded in security tag 2000. By obfuscating the client ID security of the embedded security tag 2000 is improved.

Although the opaque CID 2030 is illustrated as being generated by an XOR process, it is contemplated that many other obfuscation techniques may be used as long as the original client ID can be decoded. For example the random number may be added to or subtracted from the client ID.

Application type ID 2040 corresponding to the application using the payload of the datagram is embedded in security tag 2000 and may be chosen from a list of application types provided by UID server 1630 to UID client 1610. TCP sequence number 2050 corresponding to the sequence of the datagram in the communication to UID server 1630 is also embedded in security tag 2000.

A digital signature 2060 may be generated from, for example, a hash function or other cryptographic algorithm (include secure hash algorithms (SHA) such as SHA-0, SHA-1, SHA-224, SHA-256, SHA-384, SHA-512 or Message-Digest algorithm MD5).

In certain exemplary embodiments, the digital signature may be based on the negotiated secret key, random number 2020, opaque CID 2030, control field 2010, application type ID 2040 and TCP sequence 2050 and the payload of the datagram. Security tag 2000 does not include any secret key. UID server 1630, however, by analyzing digital signature 2060 may determine if digital signature 2060 was generated using the negotiated secret key.

Figure 18:
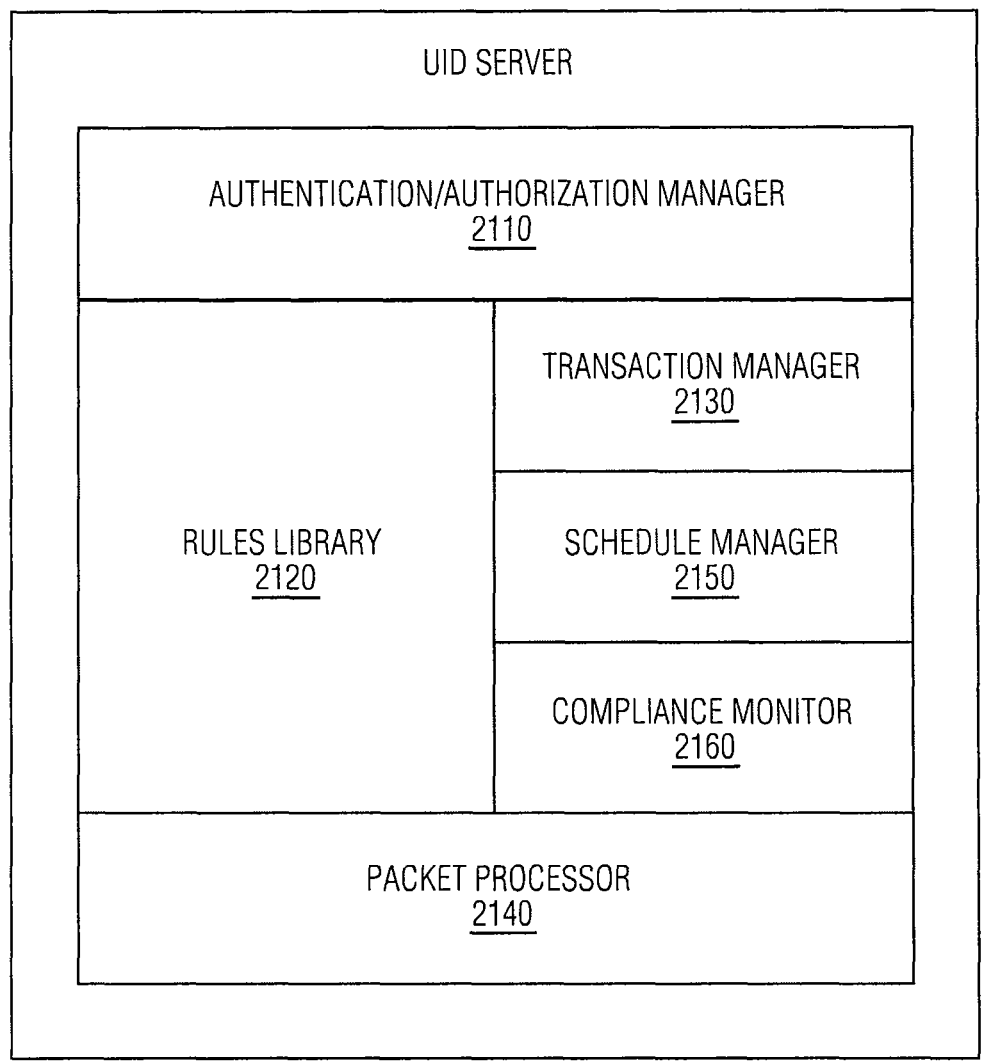
FIG. 18 is a block diagram illustrating UID server 1630 of FIG. 14.

FIG. 18 is a block diagram illustrating UID server 1630 of FIG. 14.

Now referring to FIG. 18, UID server 1630 may include: (1) a authorization/authentication (AA) manager 2110; (2) a rules library 2120; (3) a transaction manager 2130; (4) a packet processor 2140; (5) a schedule manager 2150; and (6) a compliance monitor 2160.

AA manager 2110 of UID server 1630 manages authorization and authentication processes for UID client 1610. That is, AA manager 2110 may authenticate the information provide by UID client from: (1) login requests 1810; (2) re-key requests 1830; (3) change requests 1850; and (4) security tags 2000 in packets (datagrams) sent from UID client 1610. AA manager 2110 may also authorize the user to access a particular resource (e.g., protected server 1650) based on the authenticated information from UID client 1610. AA manager 2110 may determine authorization/authentication in accordance with or based on rules stored in rules library 2120.

Transaction manager 2130 may manage transactions between UID client 1610 and respective protected network resources (for example, protected server 1650) based on protocols/standards of (i) open network 1620 and (ii) protected network 1640.

It is contemplated that transaction manager 2130 may translate first communication in the protocols/standards of open network 1620 to a second communication in the protocols/standards of protected network 1640, acting as a proxy.

Compliance monitor 2160 may determine whether communication from UID client 1610 indicates a security breach with UID client 1610. That is, by monitoring whether security tags 2000 in packets (datagrams) sent from UID client 1610 indicate non-compliance in computer health including, for example, network admission controls and host system integrity, among others, UID server 1630 may take further security measures based on, for example, predetermined quarantine rules in rules library 2120. For example, (1) UID server 1630 may cause UID server 1650 to the logout state 1740 and the user/UID client may be required to be re-authenticated/re-authorized; (2) the user/UID client 1630 may be logged out and not allowed to be re-authenticated/re-authorized, (i) for a pre-determined period-of-time, or (ii) until after a manual review by an authorized network professional.

Schedule manager 2150 may manage scheduling of network traffic through UID server 1650 from/to UID client 1610 by transaction manager 2130 based on information in security tag 2000 and established scheduling rules stored in rules library 2120

AA manager 2110 may communicate at least one of: (1) resources, (2) application types, (3) user IDs, (4) user domains, or (5) access types to the UID client 1610 to generate security tag 2000.

The information received by AA manager 2210 may be used to dynamically change rules stored in rules library 2120 related to authorization of a user, authentication of information from a UID client 1610 and/or may modify the priority of network traffic sent through UID server 1630.

Packet processor 2130 may process each packet (datagram) to validate and remove security tag 2000 for authentication/authorization by AA manager 2110. Packet processor 2130 may filter out packets under the control of AA manager 2110 that are unauthenticated or unauthorized. These unauthenticated/unauthorized packets may be dropped by UID server 1630 (i.e., they are not sent to protected network 1640 and/or protected server 1650) and may be audited by compliance monitor 2160.

Rule library 2120 may include access control lists. The access control lists may include information corresponding to the access type, the authentication/user domain, and the application validation rules for access to particular network resources. The access type (network access type) may indicate the type of access a client device/user may establish with the network (e.g., dial-up, VPN/IPSEC, intranet, extranet).

Compliance monitor 2160 assures compliance with network security policies on a packet-by-packet basis and enables audit tracking of non-compliant communication. That is, compliance monitor 2160 may determine whether a valid request for a resource is being processed from an authorized user/UID client 1610 based on information in the security tag associated with each packet that reflects the current computer/host statement of health.

Figure 19:
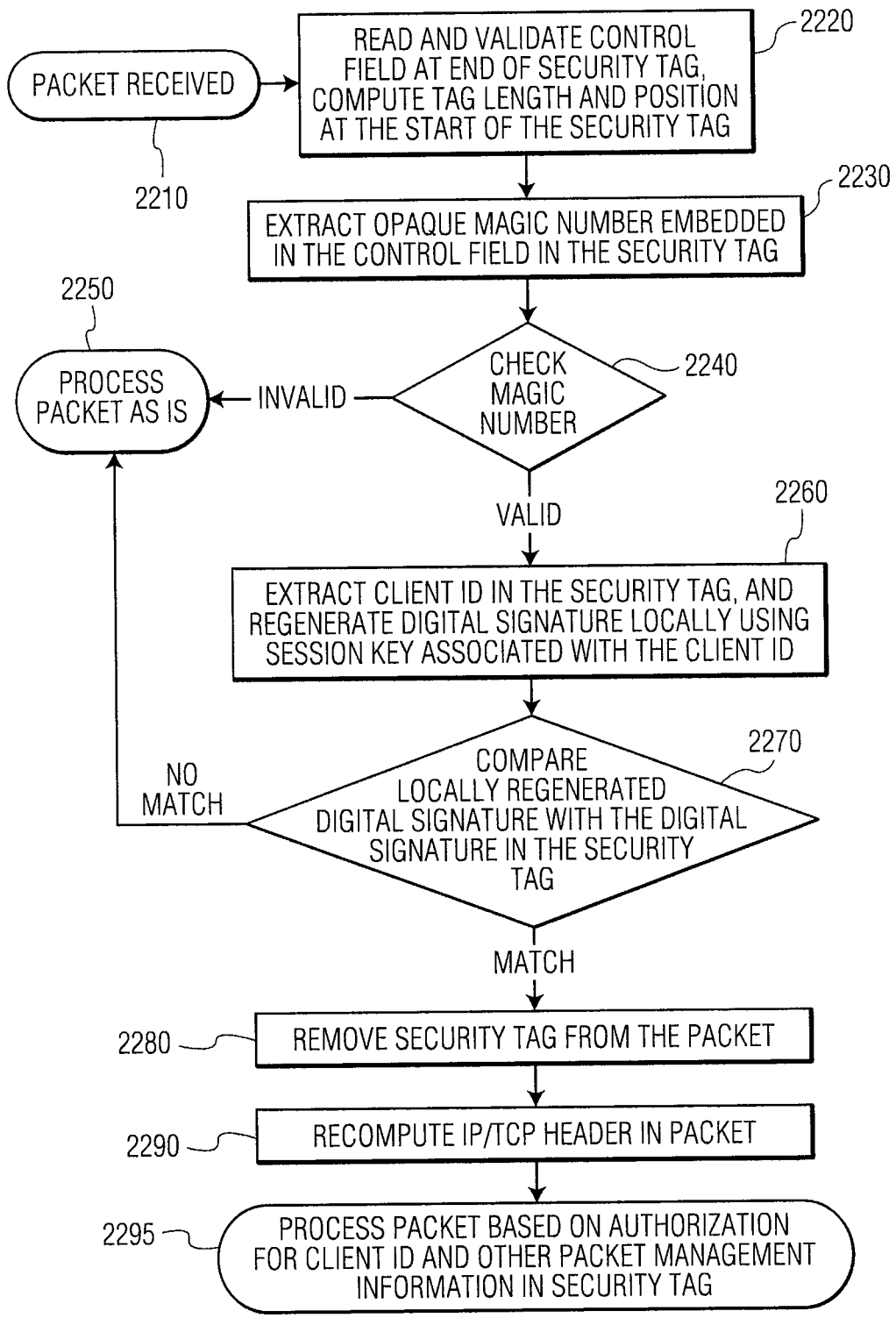
FIG. 19 is a flow chart illustrating a method of processing a packet in accordance with yet another exemplary embodiment of the invention.

FIG. 19 is a flow chart illustrating a method of packet processing in accordance with yet another exemplary embodiment of the invention.

Now referring to FIG. 19, at block 2210, packet processor 2140 of UID server 1630 may receive packets (e.g. TCP/IP packets) from UID client 1610. At block 2220, the control field at the end of security tag 2000 in each received packet may be read and validated and the length of the security tag and the starting position of the security tag may be computed. For example, this length may be negotiated (e.g., agreed upon between UID client and server 1610 and 1630 or may be predetermined).

At block 2230, the number representing the gateway instance (hereafter this number may be referred to as the GWI number) that is embedded in the control field of each respective security tag 2000 may be extracted by UID server 1630.

At block 2240, packet processor 2140 may determine whether the GWI number in a respective security tag 2000 is valid. That is, UID server 1630 may compare the GWI number embedded in the respective security tag 2000 to the actual GWI number stored on UID server 1630 to at least partially validate/authenticate the security tag 2000.

At block 2250, if the GWI number in a particular security tag 2000 is not determined to be valid, the packet processor 2140 may treat a packet as is (e.g., as having a security tag that is either not valid or non-existent). For example, in such circumstances the security tag is not removed at block 2260 and policies may be setup for packets having invalid or non-existent security tags. Such packets may be filtered out when the polices for the networks, resources and/or applications being accessed warrant such action.

At block 2260, after the GWI number is validated, the client ID may be extracted from the opaque CID 2030 of security tag 2000 and the digital signature regenerated in UID server 1630 (e.g., regenerated locally) using the session key associated with the extracted client ID.

At block 2270, the packet processor 2140 may validate/authenticate a respective packet by matching (comparing) the digital signature regenerated locally in UID server 1630 with the digital signature 2060 of the respective security tag 2000.

At block 2280, if the regenerated digital signature matches the digital signature 2060 of the respective security tag 2000, the security tag 2000 of the respective packet is removed from the packet. At block 2290, after the security tag 2000 is removed the IP/TCP header of the respective packet is recomputed to account for such removal, at block 2280.

At block 2295, packet processor 2140 processes the respective packet based on the authorization granted in accordance with client ID and other packet management information in security tag 2000.

FIG. 20 is a flow chart illustrating a method of packet management in accordance with yet another exemplary embodiment of the invention.

Now referring to FIG. 20, at block 2310, UID server 1630 receives packet management information (e.g., client and network parameters) used to determine access by a user to protected resource 1650. These parameters may include a user ID of the user of UID client 1610, (2) application type information corresponding to an application being used by the user for access to the protected resource 1650 (3) user domain information indicating a user domain of the resource being accessed, (5) UID client health state information indicating a state of health of UID client 1610, (6) UID client security compliance information indicating the security compliance of UID client 1610, and (7) other parameters the affect the security of a user or a UID client.

At block 2320, a session key may be negotiated between UID client 1610 and UID server 1630. The negotiation may include: (1) UID client 1610 sending to UID server 1630 client capability information; and (2) UID server 1630 establishing session parameters based on the client capability information. For example, UID client 1610 may support particular key algorithms, a maximum key size, and/or a particular operating system, among others. The negotiation may further include UID server 1630 sending to UID client 1610 the session parameters and information used to form the packet management information. That is, UID server 1630 may send, for example, a table of information for UID client 1610 to determine the application type to be inserted into each security tag 2000, as a portion of the packet management information. The negotiation may also include UID client and UID server 1610 and 1630 establishing a negotiated client ID and session key.

At block 2330, a session ID may be generated based on one or more of (1) the negotiated session key, the client ID and/or the GWI number. At block 2340, UID client 1610 may insert the packet management information and the session ID into each packet sent to UID server 1630.

At block 2350, compliance monitor 2160 of UID server 1630 may monitor the packet management information in each packet from UID client 1610 to determine if certain packets do not have authorization to access protected network/resource 1640 and 1650. For example, the packet management information may include client health state information or client security compliance information and the client status related to such information may be monitored.

At block 2360, packet processor 2140 under the control of compliance monitor 2160 based on policies stored in rules library 2120 may filter out respective information packets sent to UID server 1630 from UID client 1610 when the monitored packet management information indicates that access to a protected network/resource 1640 and 1650 is restricted. That is, the packet management information (for example, the health state indicated by the client device health state information in each respective information packet) may be compared by compliance monitor 2160 with pre-established policies stores in rules library 2120 to determine whether the packet management information is in compliance. For each respective packet which is not in compliance with the pre-established rules, UID server may drop the respective packet such that the respective packet is not sent to the protected network/resource 1640 and 1650.

The security system and the method for embedding a session identifier in the networking protocol disclosed herein have diverse applicability in a range of markets including financial services, horizontal wireless LAN (e.g., wireless sales force automation and contractor services), and government regulated markets such as banking and healthcare. However, these are merely exemplary applications: the present invention is not limited thereto.

In certain exemplary embodiments, a reduced size security tag, for example, including only the session identifier or the session identifier with a limited number of other fields may be inserted into each information packet sent from the client device to the server device, for which an authenticated user session has already been established. This reduced security tag (having a reduced set of packet management information) may provide optimized and adaptive interoperability with mid-stream network elements/devices such as stateful protocol, application inspection firewalls and security appliances which may place restrictions on packet header content in specific locations for security reasons.

In other exemplary embodiments, the client device, based on routing information may determine if it should delay the insertion of the session identifier and packet management information in specific information packets sent from the client device to the server device, for example, during session establishment or for a predetermined period of time from the beginning of session establishment. The delay may occur after an authenticated user session has been established. Such a delay may provide adaptive interoperability with midstream network elements/devices which may place restrictions on packet header content for security reasons during certain periods, for example, during session establishment.

Although the present invention has been largely described in terms of providing identification for a user attempting to connect to and communicate a message with a resource/application on a computer system (e.g., and application server), it is not limited thereto. As described herein, for example, the present invention may be embodied in software, in a machine (e.g., a computer system, a microprocessor based appliance, etc.) that includes software in memory, or in a computer readable carrier configured to carry out the protection scheme (e.g., in a self contained silicon device, a solid state memory, an optical disk, a magnetic disk, a radio frequency carrier wave, and an audio frequency carrier wave, etc.).

Although the present invention has primarily been described in terms of messages being transmitted between a client and a server, it is not limited to. The identification techniques disclosed herein apply to communications transmitted with respect to a wide range of computer applications, and are not limited to server applications.

The terms message and communication as used herein are intended to refer to a broad class of transmissions carried out between computer systems or portions thereof; for example, inquiries, data updates, data edits, data requests, etc.

As described herein, for example, the invention may be embodied in software, in a machine (e.g., a computer system, a microprocessor based appliance, etc.) that includes software in memory, or in a tangible computer readable carrier configured to carry out the protection scheme (e.g., in a self contained silicon device, a solid state memory, an optical disc, a magnetic disc, a radio frequency carrier medium, an audio frequency carrier medium, etc.). Further, when the invention is embodied in a user connecting to a remote system to access a resource, the remote system is not limited to an application server, and the resource is not limited to an application on an application server. As described herein, the remote system may be any remotely accessible microprocessor based device (e.g., a PDA, a personal computer, a network server, etc.), and the resource may be any resource installed on (or accessible through a connection to) the remotely accessible device.

Although the invention is illustrated and described herein with reference to specific embodiments, the invention is not intended to be limited to the details shown. Rather, various modifications may be made in the details within the scope and range equivalents of the claims and without departing from the invention.

What is claimed:

1. A method of packet management for restricting access to a resource of a computer system using client parameters and network parameters, as packet management information, said method comprising:

inserting, at a first device, the packet management information and a session ID into at least a portion of information packets sent from the first device to a second device;

monitoring, at the second device, the packet management information of the portion of the information packets sent from the first device;

filtering out respective information packets sent to the second device from the first device when the monitored packet management information indicates that access to the resource is restricted;

extracting a client ID unique to the first device from the monitored information packets;

re-generating a digital signature in the second device using a session key associated with the extracted client ID; and comparing the digital signature regenerated in the second device with the digital signature embedded in the monitored information packets.

2. The method of claim 1, wherein an unmonitored portion of the information packets sent from the first device includes information packets sent during session establishment or for a predetermined period of time from a beginning of the session establishment.

3. The method of claim 1, wherein the monitoring further includes:

reading and validating, by a packet manager of the second device, a control field at an end of the packet management information in each monitored information packet;

computing a length of the packet management information to determine a starting position thereof;

extracting and validating a unique ID that is embedded in the control field of the monitored information packets, responsive to the regenerated digital signature matching the digital signature of the respective packet management information, removing the respective packet management information from a corresponding information packet and recomputing the header of the corresponding information packet.

4. The method of claim 3, wherein the digital signature is based on at least two of: negotiated secret key, a random number, an obfuscated client, the control field, an application type a sequence number corresponding to a sequence of the information packet in a communication to the second device, or a payload of the corresponding information packet.

5. The method of claim 1, further comprising:

sending, by the second device, a resource list indicating resource that are protected; and selectively embedding packet management information in information packets based on information from the resource list.

6. The method of claim 1, further comprising:

a) identifying client parameters and network parameters, as the packet management information, used to determine access to the resource;

b) negotiating a session key between client and server devices;

c) generating a session based on at least the negotiated session key;

d) inserting the packet management information and the session into each information packet sent from the client device to the server device;

e) monitoring the packet management information in each information packet from the client device, the packet management information comprising client health state information indicating a health stat of the client; and f) filtering out respective information packets sent to the server device from the client device when the monitored packet management information indicates that access to the resource is restricted by comparing the health state indicated by the client health state information in each respective information packet with pre-established policies at the server device to determine whether the client health is in compliance with the pre-establish policies.

7. The method of claim 6, further comprising authenticating, by the server device, a user of the client device, wherein the step of negotiating the session key includes:
sending, by the client device to the server device, client device capability information;
determining, by the server device, a network access type used by the client device;
establishing, by the server device, session parameters based on at least the client device capability information;
sending, by the server device to the client device, the session parameters and information used to form the packet management information; and
establishing a client ID and the session key between the client and server devices.

8. The method of claim 6, further comprising:
sending, by the server device, a list of predetermined applications used by the computer system and at least a corresponding application ID for each predetermined application wherein the packet management information received from the client device includes one of the corresponding application IDs and is used at least in part by the server device to determine whether access to the resource is restricted to the client device.

9. The method of claim 6, further comprising:
sending, by the server device to the client device, a user ID unique to a user of the client device;
embedding the unique user ID, by the client device, in each information packet destined for the resource; and
verifying the unique user ID for each information packet.

10. The method of claim 6, wherein the monitored packet management information used to determine access to the resource includes at least one of: (1) a user ID of the user of the client device, (2) application type information corresponding to an application used by the user for access to the resource, (3) user domain information indicating a user domain of the resource being accessed, (4) client device health state information indicating a state of health of the client device, or (5) client device security compliance information indicating security compliance of the client device.

11. The method of claim 10, wherein:
for each respective information packet which is not in compliance with the pre-established rules, dropping, by the server device, the respective information packet.

12. The method of claim 6, wherein the step of filtering out respective information packets includes comparing the packet management information in each respective information packet with pre-established policies at the server device to determine whether the packet management information is in compliance with the pre-established policies, and for each respective information packet which is not in compliance with the pre-established rules, dropping, by the server device, the respective information packet.

13. The method of claim 6, wherein the step of filtering out respective information packets includes the step of restricting access to the resource by respective information packets based on at least one of: (1) user information of the client device, (2) client health information of the client device, (3) network access type information indicating a type of access of the client device or (4) application type information which is embedded in the respective information packets.

14. A system for restricting access to a resource of a computer system using packet management information that includes network and device parameters, comprising:
a first device for inserting the packet management information into information packets destined for the resource of the computer system; and
a second device including:
a packet processor for removing at least the packet management information inserted by the first device into information packets received from the first device, and
a packet manager for monitoring the removed packet management information in the information packets from the client device and for controlling the packet processor to filter out respective information packets when the network and client parameters indicate that access to the resource is restricted.
wherein the packet management information in each of the information packets is a variable length security tag and a login message to establish a session between the client and server devices includes device parameters including control flags indicating (1) a set length of the security tag and (2) whether none, a part or an entire payload is used for encryption of the security tag.

15. The system of claim 14, wherein the first device is in a logout state and sends a login request including the device parameters to initiate a communication channel with the second device using a first session key such that an operational state of the first device changes to a login state, and responsive to a predetermined period expiring and the first device not establishing a new session key with the second device, the operational state of the first device is changed to a re-key state in which the first device is limited to operations for establishing the new session key.

16. The system of claim 14, further comprising:
a storage unit for storing identified client parameters and network parameters, as the packet management information, used for comparison with rules for determining access to the resource.

17. The system of claim 14, wherein the packet manager negotiates a session key between the client device and the server device and generates a session ID based on at least the negotiated session key such that information packets received by the server device include the packet management information and the session ID.

18. The system of claim 14, wherein the packet manager controls the packet processor to filter out respective information packets sent to the server device based on the monitored packet management information and session IDs therein using the rules for determining access to the resource.

19. The system of claim 14, wherein the client device is on a first network and the resource is on a second protected network, the system further comprising:
a transaction manager for translating first communications of protocols and standards of the first network to second communication s of protocols and standards of the second protected network.

20. The system of claim 14, wherein a storage unit includes a rule library including predetermined quarantine rules for causing one of:(1) the client device to be logged out of the computer system; (2) the client device to be logged out and not allowed to be re-authenticated re-authorized for a pre determined period; and (3) the client device to be logged out and not allowed to be re-authenticated/re-authorized, the server device further comprising:
a compliance monitor for determining whether communication from the client device indicates a security breach therewith by comparing the packet management information with the predetermined quarantine rules.

21. The system of claim 14, wherein the compliance monitor determines whether a valid request for the resource is being processed form an authorized user or the client device based on information in the packet management information of each information packet which reflects a current statement of health of the client device.

22. The system of claim 14, wherein a storage unit includes a rule library including established scheduling rules, the system further comprising:
   a scheduler for managing scheduling of network traffic through the server device based on information in the packet management information and the established scheduling rules.

23. The system of claim 22, wherein the scheduler modifies priority of network traffic sent through the server device based on the packet management information in respective information packets.

24. The system of claim 14, wherein:
   the packet management information includes client device health state information; and
   the packet manager compares a health state indicated by the client device health state information in each respective information packet with preestablished policies to determine whether the client health is in compliance with the pre-established policies such that for each respective information packet which is not in compliance with the pre-established rules, the packet processor drops the respective information packet sent by the client device.

25. The system of claim 14, wherein the packet processor, controlled by the packet manager, filters out respective information packet based on at least one of: (1) user information of the client device, (2) client health information of the client device, (3) network access type information indicating a type of access of the client device or (4) application type information which is embedded in the respective information packet.

* * * * *